US010372404B2

(12) United States Patent
Miyazaki

(10) Patent No.: US 10,372,404 B2
(45) Date of Patent: Aug. 6, 2019

(54) DATA PROCESSING APPARATUS, DATA PROCESSING METHOD, AND NON-TRANSITORY COMPUTER READABLE MEDIUM

(71) Applicant: CANON KABUSHIKI KAISHA, Tokyo (JP)

(72) Inventor: Shigeyuki Miyazaki, Yokosuka (JP)

(73) Assignee: Canon Kabushiki Kaisha, Tokyo (JP)

( * ) Notice: Subject to any disclaimer, the term of this patent is extended or adjusted under 35 U.S.C. 154(b) by 87 days.

(21) Appl. No.: 15/479,443

(22) Filed: Apr. 5, 2017

(65) Prior Publication Data

US 2017/0300288 A1 Oct. 19, 2017

(30) Foreign Application Priority Data

Apr. 15, 2016 (JP) ................................ 2016-082032

(51) Int. Cl.
*G06F 3/14* (2006.01)

(52) U.S. Cl.
CPC .................................. *G06F 3/1462* (2013.01)

(58) Field of Classification Search
CPC ........ G06F 3/1462; H04N 5/222; H04N 5/76; H04N 1/00; H04N 1/132; H04N 1/00161; H04N 1/00167; H04N 1/46; H04N 1/32128; H04N 2101/00; H04N 2101/3204; H04N 2101/325; H04N 2101/3252; H04N 2101/3274
See application file for complete search history.

(56) References Cited

U.S. PATENT DOCUMENTS 6,346,885 B1 * 2/2002 Curkendall .......... A01K 11/007 340/572.4
2009/0040331 A1 * 2/2009 Kitagawa ........... H04N 1/00204 348/222.1
2009/0213962 A1 * 8/2009 Sasaki .................... H04H 20/28 375/316
2009/0290042 A1 * 11/2009 Shiohara ............ H04N 1/00132 348/222.1
2010/0299390 A1 * 11/2010 Alameh .................. G06F 3/017 709/204
2011/0032373 A1 * 2/2011 Forutanpour ........ G11B 27/034 348/222.1
2012/0173511 A1 * 7/2012 Eto .................. G06F 17/30091 707/711

(Continued)

FOREIGN PATENT DOCUMENTS

JP 2009-303122 A 12/2009

*Primary Examiner* — Christopher E Leiby
(74) *Attorney, Agent, or Firm* — Venable LLP

(57) ABSTRACT

A first apparatus sets a first parameter and a second parameter. A result of processing using a first parameter to first data is the same as a result of processing using the first parameter to second data. A result of processing using a second parameter to the first data is different from a result of processing using the second parameter to the second data. At the first apparatus, predetermined information is displayed. The set parameter is transmitted from the first apparatus to a second apparatus. The second apparatus executes processing using the received parameter to the second data and transmits determination information. At the first apparatus, the predetermined information is stopped displaying when the determination information is received.

14 Claims, 14 Drawing Sheets

(56) References Cited

U.S. PATENT DOCUMENTS

| | | | | |
|---|---|---|---|---|
| 2013/0053000 A1* | 2/2013 | Takeda | H04W 4/14 | 455/412.2 |
| 2015/0015919 A1* | 1/2015 | Anderson | H04N 1/00188 | 358/3.27 |

* cited by examiner

| TYPE OF PROCESSING | WHETHER OR NOT PROCESSING CAN BE REALIZED ONLY BY SMARTPHONE |
|---|---|
| CROP | POSSIBLE |
| SHARPNESS | IMPOSSIBLE |
| ROTATION | POSSIBLE |
| COLOR FILTER | IMPOSSIBLE |

| | |
|---|---|
| DETERMINATION INFORMATION | DETERMINED PARAMETER |
| PROCESSING INFORMATION | CROP |
| FILE INFORMATION | IMG_0001.JPG |
| PARAMETER | START POINT [40%, 5%] – END POINT [90%, 95%] |

| | |
|---|---|
| DETERMINATION INFORMATION | TENTATIVELY-DETERMINED PARAMETER |
| PROCESSING INFORMATION | SHARPNESS |
| FILE INFORMATION | IMG_0001.JPG |
| PARAMETER | SHARPNESS INTENSITY |

| | |
|---|---|
| DETERMINATION INFORMATION | DETERMINED PARAMETER |
| PROCESSING INFORMATION | SHARPNESS |
| FILE INFORMATION | IMG_0001.RAW |
| PARAMETER | SHARPNESS INTENSITY |

| | |
|---|---|
| DETERMINATION INFORMATION | TENTATIVELY-DETERMINED PARAMETER |
| PROCESSING INFORMATION | CROP |
| FILE INFORMATION | IMG_0001.JPG |
| PARAMETER | START POINT [40%, 5%] – END POINT [90%, 95%] |

| | |
|---|---|
| DETERMINATION INFORMATION | DETERMINED PARAMETER |
| PROCESSING INFORMATION | CROP |
| FILE INFORMATION | IMG_0001.RAW |
| PARAMETER | START POINT [40%, 5%] – END POINT [90%, 95%] |

DATA PROCESSING APPARATUS, DATA PROCESSING METHOD, AND NON-TRANSITORY COMPUTER READABLE MEDIUM

BACKGROUND OF THE INVENTION

Field of the Invention

The present invention relates to a data processing apparatus, a data processing method, and a non-transitory computer readable medium.

Description of the Related Art

In a case where a user owns a plurality of information devices with different characteristics, the user may use a different information device depending on the place of use. Examples of using a different information device depending on the place of use include using a smart device which is convenient for carrying around away from home and using a personal computer (PC) with high specifications at home.

In addition, generally, automatic synchronization of information is performed among the plurality of information devices so that, even if the user switches to another information device, the user can continue work having been carried out in the information device prior to switching information devices. However, depending on a processing capability, hardware characteristics, and the like of information devices, an information device may be incapable of executing processing based on received information. Therefore, depending on a processing capability, hardware characteristics, and the like of each information device, only a part of information may be considered an object of synchronization.

Recent digital cameras have a RAW recording mode. In particular, a RAW recording mode is provided in many single-lens reflex digital cameras. In the RAW recording mode, image data (RAW data) output from an image capturing element and subjected to A/D conversion is recorded as an unmodified file (a RAW file) in a detachable memory such as an SD card without undergoing image processing.

An image corresponding to a RAW file cannot be displayed on a display unit in a case where the RAW file is used as-is. Therefore, after a RAW file is transferred to an information device such as a PC, the information device applies image processing to the RAW file. Specifically, the RAW file is subjected to image processing in which a file format of the RAW file is converted into a prescribed file format such as the JPEG format. Accordingly, a display image file is generated. Such image processing is generally referred to as a "developing process". Using a display image file enables an image corresponding to the RAW file (specifically, an image corresponding to the display image file) to be displayed.

Some digital cameras have a RAW+JPEG recording mode in which, in a case of recording a RAW file, a JPEG file (an image file in the JPEG format) corresponding to the RAW file is recorded at the same time. The JPEG file is, for example, an image file obtained by executing a developing process on a RAW file corresponding to the JPEG file.

Generally, a processing capability and a storage capacity of a smart device are lower than those of a PC. Therefore, recording a RAW file only in a PC and recording only a JPEG file in a smart device enables synchronization of images between the PC and the smart device to be performed in an effortless manner.

A technique related to the use of a RAW file and a JPEG file is disclosed in, for example, Japanese Patent Application Laid-open No. 2009-303122. With the technique disclosed in Japanese Patent Application Laid-open No. 2009-303122, a retouch menu and an image quality adjustment menu are displayed in a case where a RAW file is available, but only the retouch menu is displayed to disable image quality adjustment in a case where only a JPEG file is available.

However, with conventional techniques such as the technique disclosed in Japanese Patent Application Laid-open No. 2009-303122, in a case of using an information device storing only simplified image files (such as JPEG files), only parameters related to a part of data processing can be set. Therefore, setting parameters related to other data processing requires the use of an information device storing unsimplified image files (such as RAW files) which increases the hassle for a user. In addition, the user must keep previously-conceived contents of image processing memorized until the parameters related to other data processing are set. Furthermore, the user cannot assess which parameter is undetermined. Therefore, in conventional techniques, convenience of synchronization among a plurality of apparatuses is low.

SUMMARY OF THE INVENTION

The present invention provides a technique that enables convenience of synchronization of information among a plurality of apparatuses to be improved.

The present invention in its first aspect provides a data processing apparatus, which is a second apparatus communicating with a first apparatus, wherein the first apparatus comprises:

a first setting unit configured to set a first parameter, wherein when the first parameter is used for processing to first data and second data, a result of processing to the first data is the same as a result of processing to the second data which is corresponding to the first data and is larger than the size of the first data;

a second setting unit configured to set a second parameter, wherein when the second parameter is used for processing to the first data and the second data, a result of processing to the first data is different from a result of processing to the second data;

a first processing unit configured to execute processing using the first parameter to the first data;

a first transmitting unit configured to transmit the set parameter to the second apparatus; and a display control unit configured to display predetermined information indicating the parameter has not been determined, wherein the second apparatus comprises:

a receiving unit configured to receive the set parameter from the first apparatus;

a second processing unit configured to execute processing using the received parameter to the second data; and a second transmitting unit configured to transmit determination information indicating that the parameter to be used for processing has been determined, and wherein the display control unit stops displaying the predetermined information when the determination information is received at the first apparatus.

The present invention in its second aspect provides a data processing apparatus, which is a first apparatus communicating with a second apparatus, comprising:

a first setting unit configured to set a first parameter, wherein when the first parameter is used for processing to first data and second data, a result of processing to the first data is the same as a result of processing to the second data which is corresponding to the first data and is larger than the size of the first data;

a second setting unit configured to set a second parameter, wherein when the second parameter is used for processing to the first data and the second data, a result of processing to the first data is different from a result of processing to the second data;

a processing unit configured to execute processing using the first parameter to the first data;

a transmitting unit configured to transmit the set parameter to the second apparatus;

a display control unit configured to display predetermined information indicating the parameter has not been determined; and a receiving unit configured to receive determination information indicating that the parameter to be used for processing has been determined, and wherein the display control unit stops displaying the predetermined information when the determination information is received.

The present invention in its third aspect provides a data processing method for a second apparatus communicating with a first apparatus, wherein the first apparatus comprises:

a first setting unit configured to set a first parameter, wherein when the first parameter is used for processing to first data and second data, a result of processing to the first data is the same as a result of processing to the second data which is corresponding to the first data and is larger than the size of the first data;

a second setting unit configured to set a second parameter, wherein when the second parameter is used for processing to the first data and the second data, a result of processing to the first data is different from a result of processing to the second data;

a processing unit configured to execute processing using the first parameter to the first data;

a transmitting unit configured to transmit the set parameter to the second apparatus; and a display control unit configured to display predetermined information indicating the parameter has not been determined, wherein the method comprises the steps of:

receiving the set parameter from the first apparatus;

executing processing using the received parameter to the second data; and transmitting determination information indicating that the parameter to be used for processing has been determined, and wherein the display control unit stops displaying the predetermined information when the determination information is received at the first apparatus.

The present invention in its fourth aspect provides a data processing method for a first apparatus communicating with a second apparatus, comprising the steps of:

setting a first parameter, wherein when the first parameter is used for processing to first data and second data, a result of processing to the first data is the same as a result of processing to the second data which is corresponding to the first data and is larger than the size of the first data;

setting a second parameter, wherein when the second parameter is used for processing to the first data and the second data, a result of processing to the first data is different from a result of processing to the second data;

executing processing using the first parameter to the first data;

transmitting the set parameter to the second apparatus;

displaying predetermined information indicating the parameter has not been determined; and receiving determination information indicating that the parameter to be used for processing has been determined, wherein the predetermined information is stopped displaying when the determination information is received.

The present invention in its fifth aspect provides a non-transitory computer-readable medium that stores a program wherein the program causes a computer to execute a data processing method for a second apparatus communicating with a first apparatus, wherein the first apparatus comprises:

a first setting unit configured to set a first parameter, wherein when the first parameter is used for processing to first data and second data, a result of processing to the first data is the same as a result of processing to the second data which is corresponding to the first data and is larger than the size of the first data;

a second setting unit configured to set a second parameter, wherein when the second parameter is used for processing to the first data and the second data, a result of processing to the first data is different from a result of processing to the second data;

a processing unit configured to execute processing using the first parameter to the first data;

a transmitting unit configured to transmit the set parameter to the second apparatus; and a display control unit configured to display predetermined information indicating the parameter has not been determined, wherein the method comprises the steps of:

receiving the set parameter from the first apparatus;

executing processing using the received parameter to the second data; and transmitting determination information indicating that the parameter to be used for processing has been determined, and wherein the display control unit stops displaying the predetermined information when the determination information is received at the first apparatus.

The present invention in its sixth aspect provides a non-transitory computer-readable medium that stores a program wherein the program causes a computer to execute a data processing method for a first apparatus communicating with a second apparatus, comprising the steps of:

setting a first parameter, wherein when the first parameter is used for processing to first data and second data, a result of processing to the first data is the same as a result of processing to the second data which is corresponding to the first data and is larger than the size of the first data;

setting a second parameter, wherein when the second parameter is used for processing to the first data and the second data, a result of processing to the first data is different from a result of processing to the second data;

executing processing using the first parameter to the first data;

transmitting the set parameter to the second apparatus;

displaying predetermined information indicating the parameter has not been determined; and receiving determination information indicating that the parameter to be used for processing has been determined, and wherein the predetermined information is stopped displaying when the determination information is received.

According to the present invention, convenience of synchronization of information among a plurality of apparatuses can be improved.

Further features of the present invention will become apparent from the following description of exemplary embodiments with reference to the attached drawings.

BRIEF DESCRIPTION OF THE DRAWINGS

FIGS. 4A to 4E are diagrams showing an example of information transmitted and received by the system according to the first to third embodiments;

DESCRIPTION OF THE EMBODIMENTS

First Embodiment

Figure 1:
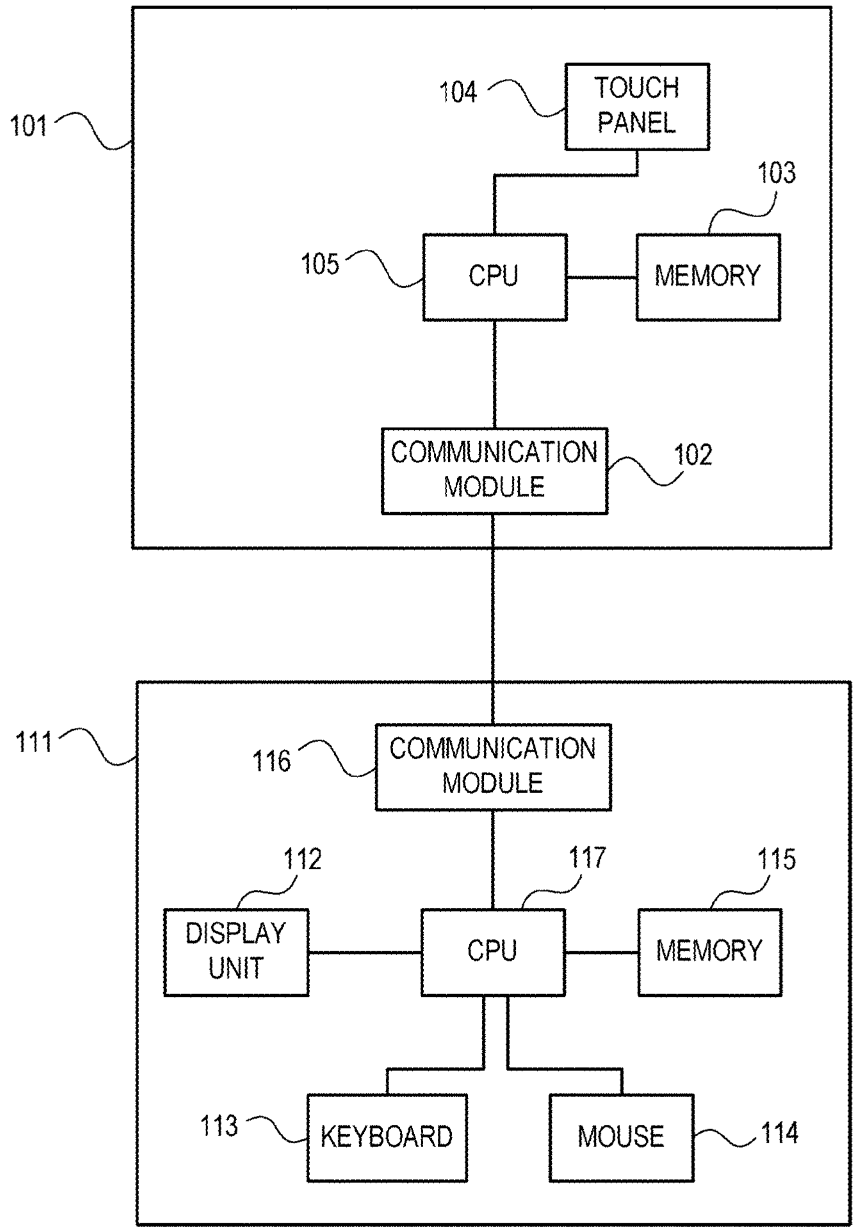
FIG. 1 is a block diagram showing an example of a configuration of a system according to first to third embodiments.

A first embodiment of the present invention will be described below. FIG. 1 is a block diagram showing an example of a configuration of a data processing system according to the present embodiment. The data processing system shown in FIG. 1 includes two data processing apparatuses (a first apparatus capable of executing data processing on first data and a second apparatus capable of executing data processing on second data). The first apparatus and the second apparatus can be respectively connected to an external apparatus and, in the present embodiment, the first apparatus and the second apparatus are connected to each other. A method of connecting the first apparatus and the second apparatus to each other is not particularly limited. The first apparatus and the second apparatus may be connected to each other in a wireless manner or with a cable. While the first apparatus and the second apparatus are not particularly limited, in the example shown in FIG. 1, a smartphone 101 is used as the first apparatus and a personal computer 111 is used as the second apparatus.

The smartphone 101 includes a communication module 102, a memory 103, a touch panel 104, and a CPU 105. The CPU 105 controls respective functions of the smartphone 101. For example, the CPU 105 controls respective functions of the smartphone 101 by reading and executing a program stored in the memory 103. The memory 103 records the program described above, an image file (first data) synchronized with the personal computer 111, a list of image processing (data processing) of which a user operation can be accepted by the smartphone 101, and the like. The memory 103 is also used as a work memory in a case where the CPU 105 performs processing. The communication module 102 is used by the smartphone 101 to communicate with other apparatuses. In the present embodiment, the communication module 102 is used to realize communication between the smartphone 101 and the personal computer 111. The touch panel 104 displays various images (an image based on an image file, a GUI image for assisting user operations related to image processing, and the like). In addition, the touch panel 104 is capable of accepting user operations with respect to the smartphone 101 (a GUI image displayed on the touch panel 104 or the like).

Alternatively, at least any of the program, the image file, and the list may be recorded in a storage unit which differs from the memory 103. As the storage unit, a semiconductor memory, a magnetic disk, an optical disk, or the like can be used. The storage unit may be built into the smartphone 101 or may be attachable to and detachable from the smartphone 101. The smartphone 101 may include a working memory which differs from the memory 103. The first data is not limited to an image file and data processing is not limited to image processing. For example, speech data, music data, text data, or the like may be used as the first data and other processing corresponding to a type of the first data may be performed as data processing. In place of the touch panel 104, a display panel (a liquid crystal panel, an organic EL panel, a plasma panel, or the like) which displays various images and an operating unit (a keyboard, a mouse, or the like) which accepts user operations may be used.

The personal computer 111 includes a display unit 112, a keyboard 113, a mouse 114, a memory 115, a communication module 116, and a CPU 117. The CPU 117 controls respective functions of the personal computer 111. For example, the CPU 117 controls respective functions of the personal computer 111 by reading and executing a program stored in the memory 115. The program described above, an image file (second data) synchronized with the smartphone 101, and the like are recorded in the memory 115. The memory 115 is also used as a work memory in a case where the CPU 117 performs processing. The communication module 116 is used by the personal computer 111 to communicate with other apparatuses. In the present embodiment, the communication module 116 is used to realize communication between the smartphone 101 and the personal computer 111. The display unit 112 displays various images. The keyboard 113 and the mouse 114 accept user operations with respect to the personal computer 111.

Alternatively, at least any of the program and the image file may be recorded in a storage unit which differs from the memory 115. As the storage unit, a semiconductor memory, a magnetic disk, an optical disk, or the like can be used. The storage unit may be built into the personal computer 111 or may be attachable to and detachable from the personal computer 111. The personal computer 111 may include a working memory which differs from the memory 115. The second data is not limited to an image file and data processing is not limited to image processing. The display unit 112 may be a separate apparatus from the personal computer 111. The display unit 112 may include a touch panel which accepts user operations with respect to the personal computer 111.

Examples of pieces of data recorded in the memory 103 of the smartphone 101 and the memory 115 of the personal computer 111 will be described with reference to FIG. 2. In the example shown in FIG. 2, four image files 201*a* to 204*a* are recorded in the memory 103 as first data. In addition, four image files 201*b* to 204*b* are recorded in the memory 115 as second data. The four image files 201*a* to 204*a* respectively correspond to the four image files 201*b* to 204*b*.

A data size of the second data is larger than a data size of the first data. While the image files 201*a* to 204*a* and 201*b* to 204*b* are not particularly limited, in the present embodiment, the image files 201*a* to 204*a* are JPEG files and the image files 201*b* to 204*b* are RAW files. In addition, the image files 201*a* to 204*a* have an image size of 2000 horizontal pixels× 1500 vertical pixels and the image files 201*b* to 204*b* have an image size of 4000 horizontal pixels×3000 vertical pixels.

In the present embodiment, by sharing common file names between the first data and the second data as file names excluding extensions, a correspondence relationship between the first data and the second data is clarified. For example, since the image file 201*a* and the image file 201*b* correspond to each other, a same file name "IMG_0001" is used by the image file 201*a* and the image file 201*b*. In a similar manner, the image file 202*a* and the image file 202*b* correspond to each other, the image file 203*a* and the image file 203*b* correspond to each other, and the image file 204*a* and the image file 204*b* correspond to each other. Therefore, for each of these combinations, a same file name is used by the two image files which make up the combination.

In addition, a list 210 is recorded in the memory 103 of the smartphone 101. The list 210 is a list of types of image processing for which the smartphone 101 can accept user operations. Examples of a user operation corresponding to image processing include a user operation for starting the image processing and a user operation for starting setting a parameter to be used in the image processing. The list 210 includes a type of first data processing and a type of second data processing. The first data processing is data processing using a first parameter which is a parameter determinable by the smartphone 101. Because a result of the first data processing using a first parameter to the first data is the same as/very similar to a result of the first data processing using the first parameter to the second data. The second data processing is data processing using a second parameter which is a parameter not determinable by the smartphone 101 but determinable by the personal computer 111. Because a result of the second data processing using a second parameter to the first data is different from a result of the second data processing using the second parameter to the second data.

The list 210 describes, for a type of image processing, whether the image processing is the first data processing or the second data processing. In FIG. 2, "possible" is described for a type of the first data processing and "impossible" is described for a type of the second data processing. While the first data processing and the second data processing are not particularly limited, in FIG. 2, a crop processing for cutting out a part of an image and a rotation processing for rotating an image are used as the first data processing. In addition, sharpness processing for adjusting sharpness of an image and color filter processing for adjusting color of an image are used as the second data processing.

Figure 3A:
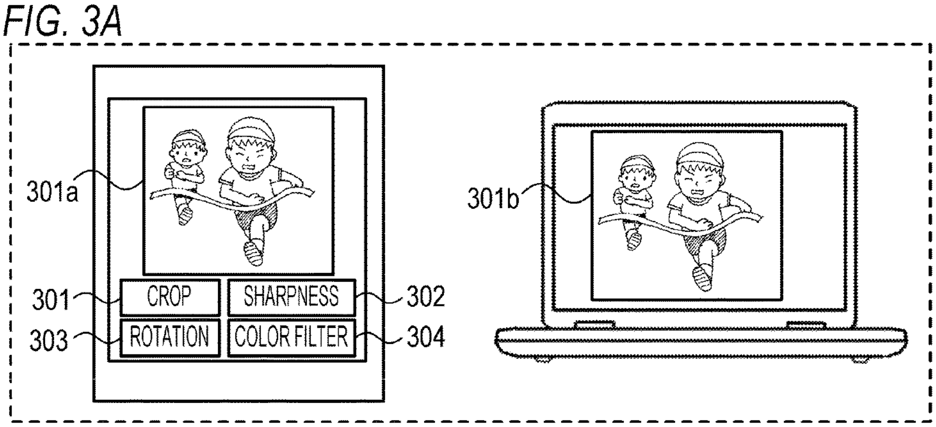
FIGS. 3A to 3C are diagrams showing examples of display according to the first embodiment.
Figure 3B:
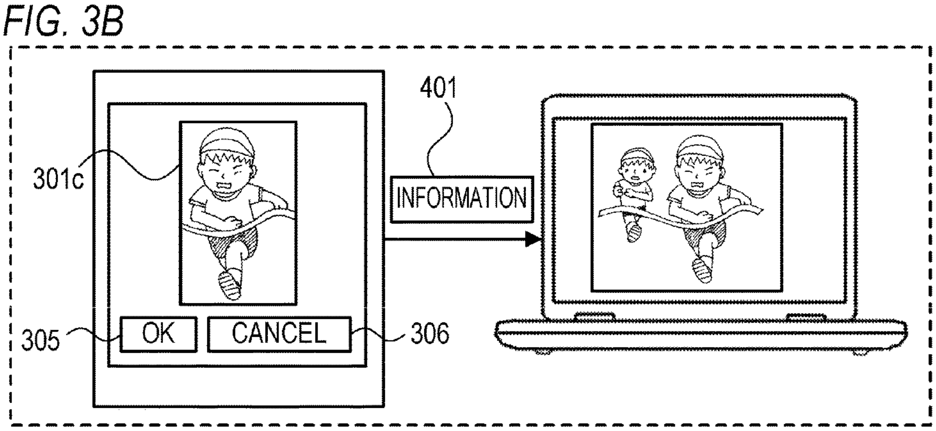
Figure 3C:
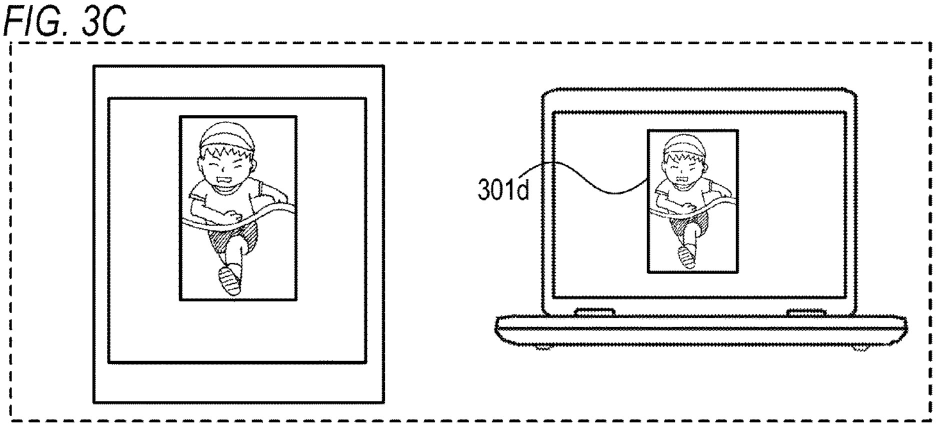
Figure 7A:
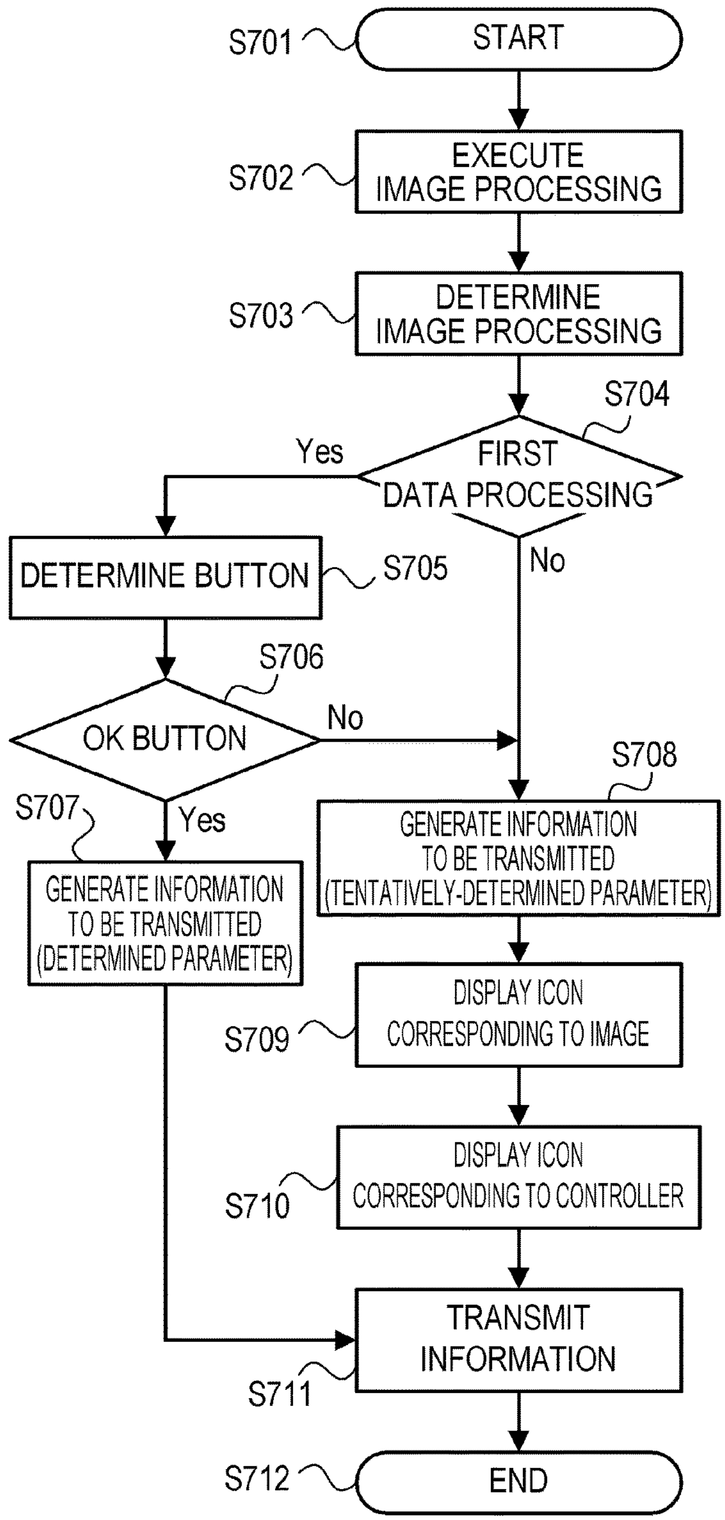
FIGS. 7A and 7B are flow charts showing an example of an operation of the system according to the first to third embodiments.
Figure 7B:
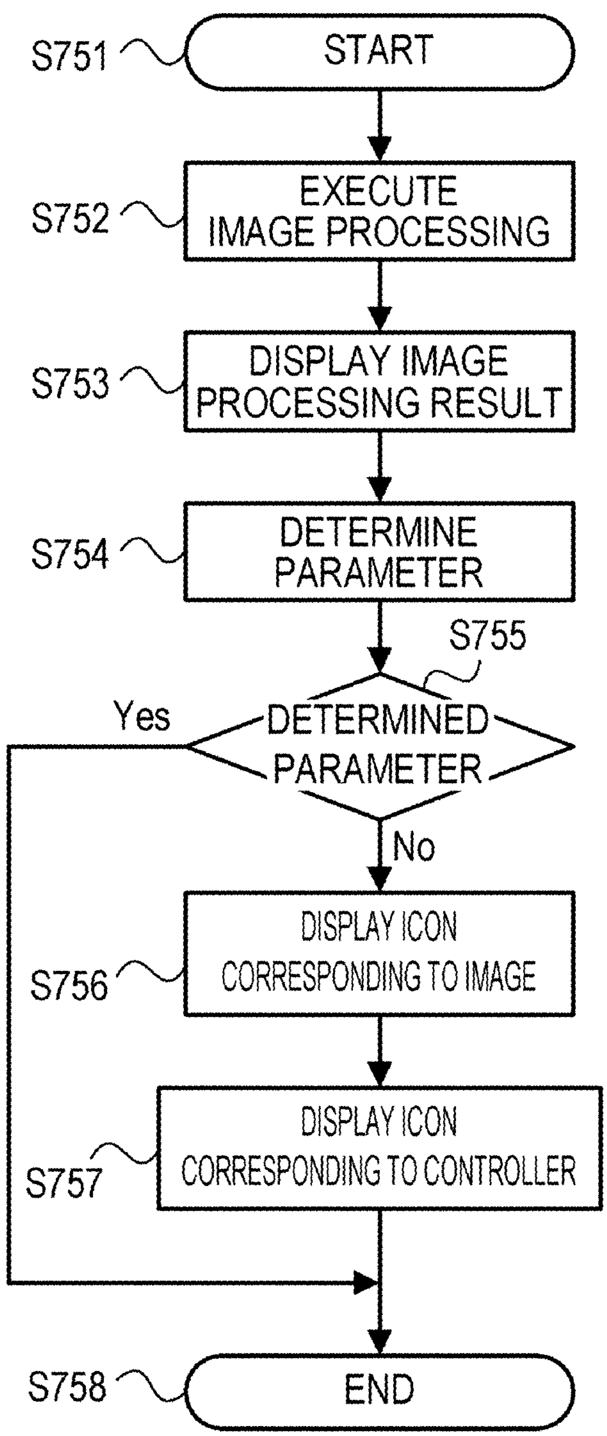

An example of an operation of the data processing system according to the present embodiment will be described with reference to FIGS. 3A to 3C, 4A, 7A, and 7B. FIGS. 3A to 3C are diagrams showing examples of display of the smartphone 101 (the touch panel 104) and display of the personal computer 111 (the display unit 112). FIG. 4A is a diagram showing an example of information transmitted from the smartphone 101 to the personal computer 111. FIG. 7A is a flow chart showing an example of an operation of the smartphone 101, and FIG. 7B is a flow chart showing an example of an operation of the personal computer 111.

An operation of the smartphone 101 will now be described. First, in S701, the operation of the smartphone 101 is started. At this point, the display shown in FIG. 3A is performed. The display by the smartphone 101 is controlled by the CPU 105 and the display by the personal computer 111 is controlled by the CPU 117. In FIG. 3A, an image based on first data is displayed on a screen of the smartphone 101 and an image based on second data which corresponds to the first data is displayed on a screen of the personal computer 111. Specifically, an image 301*a* based on the image file 201*a* is displayed on the screen of the smartphone 101, and an image 301*b* based on the image file 201*b* is displayed on the screen of the personal computer 111. In addition, in FIG. 3A, buttons 301 to 304 which correspond to image processing are further displayed on the screen of the smartphone 101. The button 301 corresponds to the crop processing, the button 302 corresponds to the sharpness processing, the button 303 corresponds to the rotation processing, and the button 304 corresponds to the color filter processing. In a case where any of the buttons 301 to 304 is pressed (selected) by the user, the smartphone 101 becomes capable of executing the image processing (setting a parameter of the image processing) corresponding to the pressed button. For example, in a case where the button 301 is pressed, the smartphone 101 becomes capable of executing the crop processing. While one type of image processing is selected by pressing one button in the example shown in FIG. 3A, a plurality of types of image processing may be selected at the same time.

Next, in S702, the smartphone 101 (the CPU 105) executes the image processing corresponding to the pressed button on the image file 201*a* displayed by the smartphone 101. In the present embodiment, in a case where any of the buttons 301 to 304 is pressed, a parameter used in the image processing corresponding to the pressed button can be set. The CPU 105 sets a parameter in accordance with the user operation and executes image processing using the set parameter.

In the present embodiment, an example of a case where the button 301 is pressed will be described. In a case where the button 301 is pressed, a parameter (a first parameter) used in the crop processing can be set. Specifically, an image region (a cutout region) to be cut out by the crop processing can be set. In accordance with a user operation for specifying a cutout region, the CPU 105 performs a crop processing of setting the specified cutout region and cutting out an image of the set cutout region.

In addition, in S703, the smartphone 101 (the CPU 105) determines whether the image processing executed in S702 is the first data processing or the second data processing. In S703, the determination is made using the list 210. Subsequently, in S704, processing is branched in accordance with a result of the determination of S703. According to the list 210, the crop processing is the first data processing. Therefore, after processing is advanced from S703 to S704, the processing is advanced from S704 to S705.

Due to the processes of S702 and S703, the display changes from the display in FIG. 3A to the display in FIG. 3B. In FIG. 3B, an image 301*c* based on an image file obtained by applying the crop processing to the image file 201*a* is displayed on the screen of the smartphone 101. In addition, in FIG. 3B, an OK button 305 and a cancel button 306 are further displayed on the screen of the smartphone 101.

In S705, the smartphone 101 (the CPU 105) determines a type of a pressed button. In this case, a determination is made on which of the OK button 305 and the cancel button 306 had been pressed. Subsequently, in S706, processing is branched in accordance with a result of the determination of S7. In a case where the OK button 305 is pressed by the user, the CPU 105 determines the parameters et in S7 as a parameter and advances processing to S707. Although not shown, in a case where the cancel button 306 is pressed by the user, the CPU 105 cancels the crop processing performed in S702 and returns processing to S701. In the present embodiment, an example of a case where the OK button 305 is pressed and processing is advanced to S707 will be described.

In S707, the smartphone 101 (the CPU 105) generates information to be transmitted to the personal computer 111. In S707, information is generated so that the set parameter is transmitted to the personal computer 111. Specifically, information is generated so that the parameter determined in S705 is transmitted to the personal computer 111. In the present embodiment, information 401 shown in FIG. 4A is generated. The information 401 includes the set parameter and other information (determination information, processing information, and file information) corresponding to the set parameter. The information 401 includes a start point coordinate and an end point coordinate of a cutout region as a set parameter. The determination information indicates whether or not the set parameter is a determined parameter (a parameter which has been determined). In the information 401, the determination information indicates that the set parameter is a determined parameter. The processing information indicates a type of the image processing corresponding to the set parameter. In the information 401, the processing information indicates the crop processing. The file information indicates an image file which is an object of the image processing using the set parameter. In the information 401, the file information is a file name "IMG_0001.JPG" of the image file 201*a*.

Finally, in S711, the smartphone 101 (the CPU 105) transmits the information generated in S707 to the personal computer 111. Specifically, the CPU 105 transmits the information generated in S707 to the personal computer 111 using the communication module 102. Subsequently, processing is advanced to S712 and the operation of the smartphone 101 (the flow chart shown in FIG. 7A) is ended. In a case where processing is advanced from S706 to S707, the display of the smartphone 101 changes from the display in FIG. 3B to the display in FIG. 3C. In FIG. 3C, the OK button 305 and the cancel button 306 have been deleted from the screen of the smartphone 101. Accordingly, a user of the smartphone 101 can identify (assess) that the parameter for the crop processing has been determined. An example of making non-determination of a parameter identifiable (assessable) will be described in detail in another embodiment.

An operation of the personal computer 111 will now be described. First, in S751, the operation of the personal computer 111 is started. At this point, display of FIGS. 3A and 3B is performed by the personal computer 111. In a case where the personal computer 111 (the communication module 116) receives information (a set parameter) from the smartphone 101, the process of S752 is performed. In the present embodiment, an example in which the information 401 shown in FIG. 4A is received will be described.

In S752, the personal computer 111 (the CPU 117) executes image processing using the parameter included in the received information 401. In this case, image processing indicated by the processing information in the information 401 is executed as the image processing. In addition, the image processing is executed on an image file (second data) corresponding to the image file (first data) indicated by the file information in the information 401. Specifically, the information 401 shows that a crop processing has been executed on an image file with the file name "IMG_0001.JPG" by the smartphone 101. Therefore, the CPU 117 executes a crop processing using the parameter included in the information 401 on the image file 201*b*.

Next, in S753, the personal computer 111 (the CPU 117) controls display of the display unit 112 (display control) so that an image 301*d* based on the image file obtained by the process of S752 is displayed. As a result, the display of the personal computer 111 changes from the display in FIG. 3B to the display in FIG. 3C. In FIG. 3C, only the image 301*d* is displayed on the screen of the personal computer 111. Accordingly, a user of the personal computer 111 can assess that the parameter for the crop processing has been determined. An example of making non-determination of a parameter assessable will be described in detail in another embodiment. Alternatively, determination of a parameter may be made assessable by other display methods. For example, determination of a parameter may be made assessable by a prescribed graphic image (an icon, a text, or the like).

In addition, in S754, the personal computer 111 (the CPU 117) determines whether or not the parameter included in the received information 401 is a determined parameter. In S754, a determination of whether or not the parameter is a determined parameter is made by referring to the determination information included in the received information 401. Subsequently, in S755, processing is branched in accordance with a result of the determination of S754. Since the parameter included in the information 401 is a determined parameter, after processing is advanced from S754 to S755, the processing is advanced from S755 to S758. In addition, in S758, the operation of the personal computer 111 (the flow chart shown in FIG. 7B) is ended.

Second Embodiment

A second embodiment of the present invention will be described below. In the first embodiment, an example of performing the first data processing (specifically, a crop processing) has been described. In the second embodiment, an example of performing the second data processing will be described. As described in the first embodiment, the first data processing is data processing using a first parameter which is determinable by the smartphone 101. The second data processing is data processing using a second parameter which is a parameter not determinable by the smartphone 101 but determinable by the personal computer 111. Hereinafter, configurations and processes that differ from those of the first embodiment will be described in detail and descriptions of configurations and processes that are similar to those of the first embodiment will be omitted.

Figure 2:
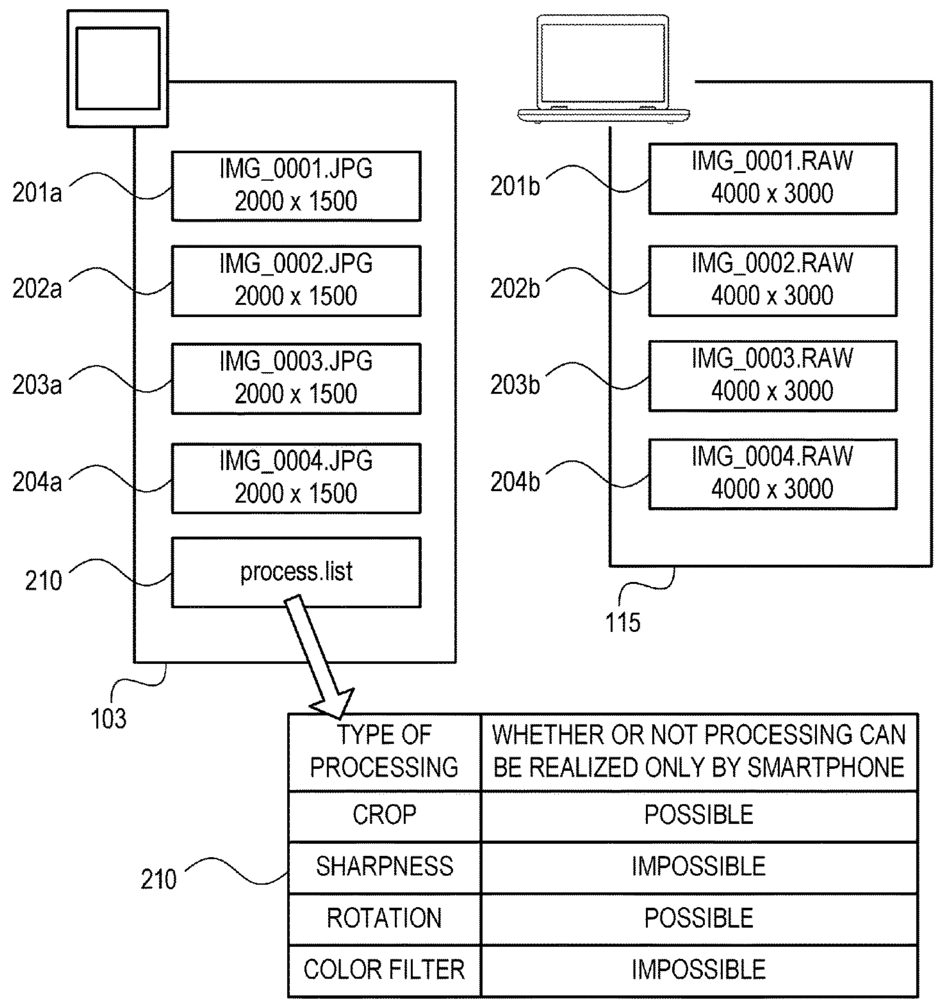
FIG. 2 is a diagram showing examples of pieces of data recorded in a memory according to the first to third embodiments.

As shown in FIG. 2, a JPEG file handled by the smartphone 101 may sometimes have a smaller image size than a RAW file handled by the personal computer 111. For example, image size reduction is performed in order to obtain a JPEG file to be handled by the smartphone 101 in consideration of a reduction in image transfer time from the personal computer 111 to the smartphone 101, an image processing capability of the smartphone 101, or the like. Hereinafter, an image of a JPEG file handled by the smartphone 101 will be described as a "reduced image" and an image of a RAW file handled by the personal computer 111 will be described as an "unreduced image"

As sharpness processing, a filtering process using a prescribed filter may be performed. A case where a desired result is obtained by a filtering process with respect to a reduced image by the smartphone 101 will now be described. In this case, even if a filtering process using a same parameter as the parameter used by the smartphone 101 is performed on an unreduced image by the personal computer 111, a desired result may not always be obtained. Therefore, a parameter of the filtering process is desirably determined using an unreduced image by the personal computer 111. In other words, the parameter used in the filtering process is desirably handled as a second parameter and the filtering process is desirably handled as second data processing.

Figure 8A:
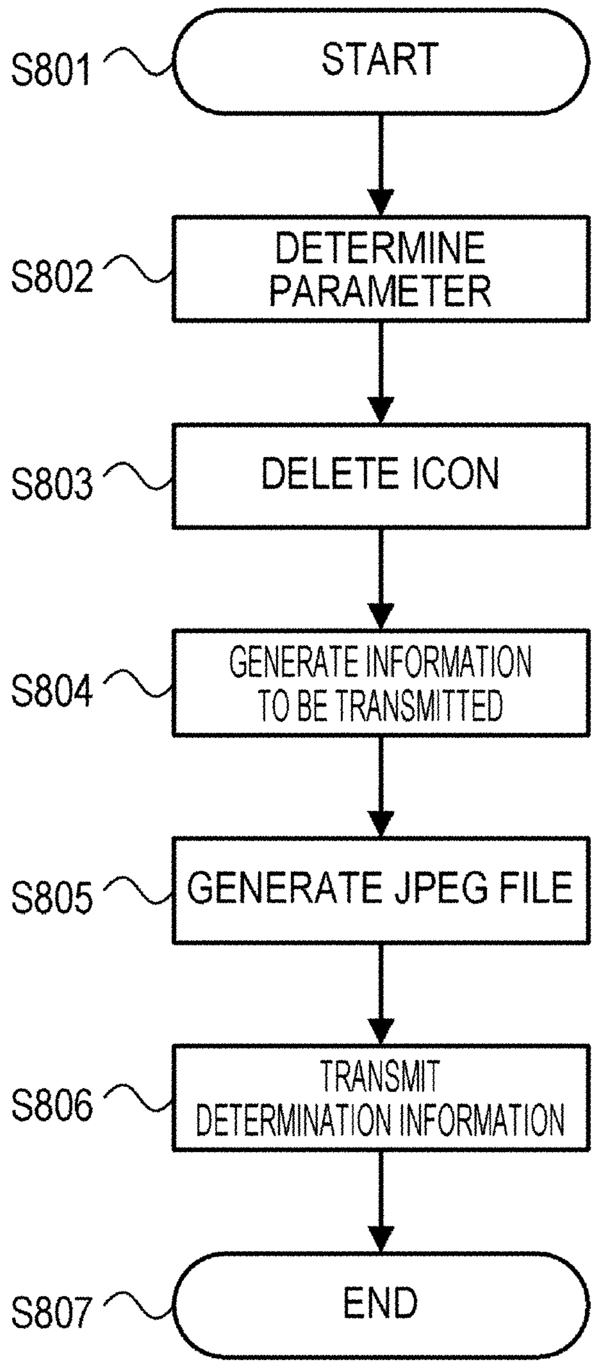
FIGS. 8A and 8B are flow charts showing an example of an operation of the system according to the second and third embodiments.
Figure 8B:
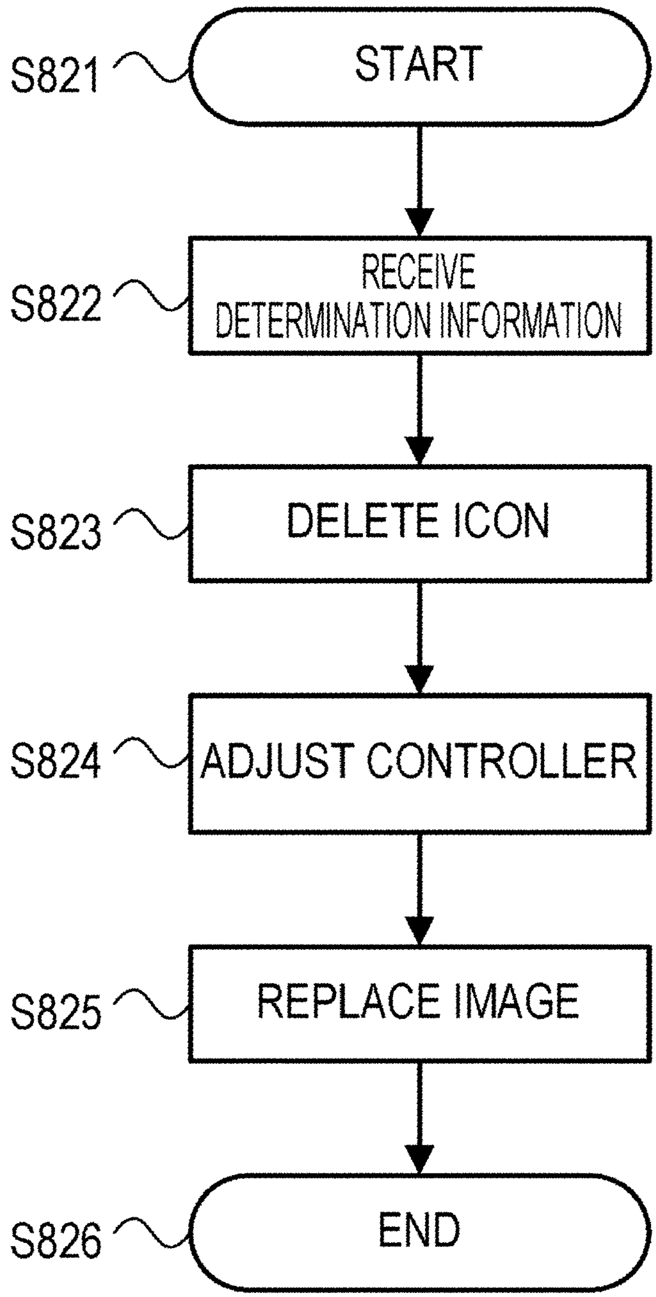

An example of an operation of the data processing system according to the present embodiment will be described with reference to FIGS. 4B, 4C, 5A to 5F, 7A, 7B, 8A, and 8B. FIG. 4B is a diagram showing an example of information transmitted from the smartphone 101 to the personal computer 111. FIG. 4C is a diagram showing an example of information transmitted from the personal computer 111 to the smartphone 101. FIGS. 5A to 5F are diagrams showing examples of display of the smartphone 101 and display of the personal computer 111. FIG. 8A is a flow chart showing an example of an operation of the personal computer 111, and FIG. 8B is a flow chart showing an example of an operation of the smartphone 101. Hereinafter, an example of performing a sharpness processing which is a filtering process and which is second data processing will be described.

Figure 5A:
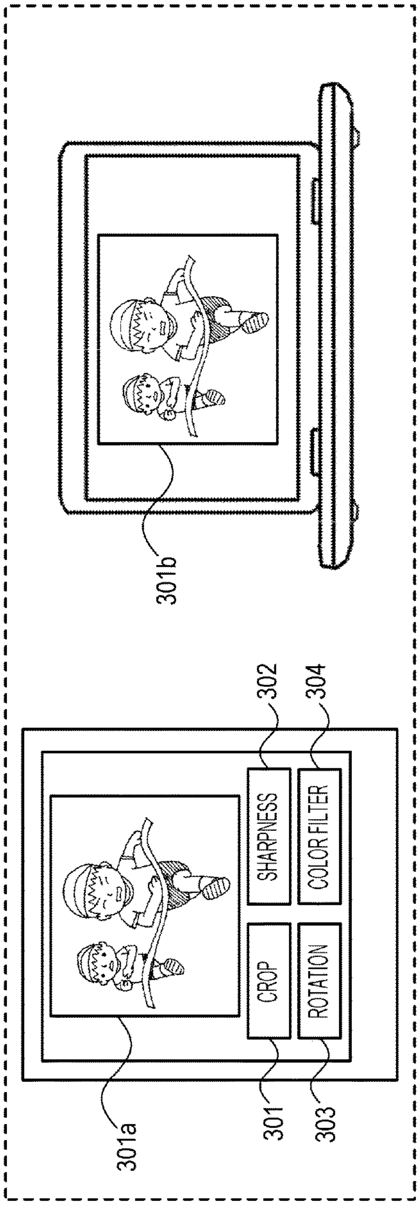
FIGS. 5A to 5F are diagrams showing examples of display according to the second embodiment.

An operation of the smartphone 101 prior to determination of a parameter of sharpness processing will be described with reference to the flow chart in FIG. 7A. First, in S701, the operation of the smartphone 101 is started. At this point, the display shown in FIG. 5A is performed. FIG. 5A is the same as FIG. 3A. In a case where the button 302 is pressed, the smartphone 101 becomes capable of executing the sharpness processing.

Figure 5B:
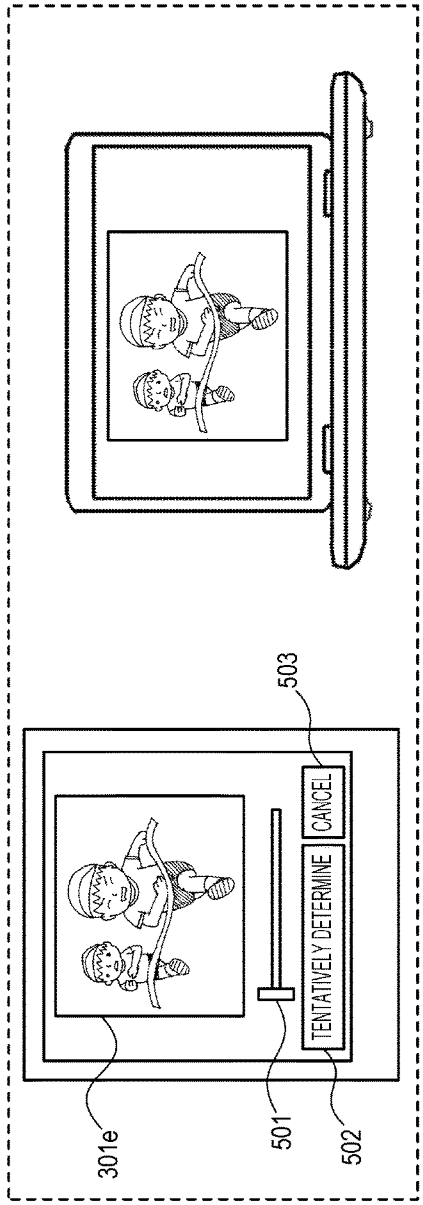

Next, in S702, the smartphone 101 (the CPU 105) executes the image processing corresponding to the pressed button on the image file 201*a* displayed by the smartphone 101. Specifically, in a case where the button 302 is pressed, display changes from the display in FIG. 5A to the display in FIG. 5B. In FIG. 5B, an image 301*e* based on an image file obtained by applying the sharpness processing to the image file 201*a* is displayed on the screen of the smartphone 101. In addition, in FIG. 5B, a slider bar 501, a tentative determination button 502, and a cancel button 503 are further displayed on the screen of the smartphone 101. The user can specify a parameter of the sharpness processing using the slider bar 501. The CPU 105 sets the specified parameter and applies the sharpness processing using the set parameter to the image file 201*a*. In a case where the tentative determination button 502 is pressed, the CPU 105 tentatively determines the set parameter as a parameter and advances processing to S703. In a case where the cancel button 503 is pressed, the CPU 105 cancels the performed sharpness processing and returns processing to S701.

Alternatively, the sharpness processing (the second data processing) may be data processing which cannot be executed by the smartphone 101. In this case, only the tentative determination of the parameter of the sharpness processing is performed and processing is advanced from S702 to S703 without performing the sharpness processing.

In S703, the smartphone 101 (the CPU 105) determines whether the image processing executed in S702 is the first data processing or the second data processing. In S703, the determination is made using the list 210 shown in FIG. 2. Subsequently, in S704, processing is branched in accordance with a result of the determination of S703. According to the list 210, the sharpness processing is the second data processing. Therefore, after processing is advanced from S703 to S704, the processing is advanced from S704 to S708.

In S708, the smartphone 101 (the CPU 105) generates information to be transmitted to the personal computer 111. In S708, information is generated so that the set parameter is transmitted to the personal computer 111. Specifically, information is generated so that the parameter tentatively determined in S702 is transmitted to the personal computer 111. In the present embodiment, information 402 shown in FIG. 4B is generated. The information 402 includes the set parameter and other information (determination information, processing information, and file information) corresponding to the set parameter. The information 402 includes sharpness intensity as a set parameter. In the information 402, the determination information indicates that the set parameter is not a determined parameter. Specifically, in the information 402, the determination information indicates that the set parameter is a tentatively-determined parameter (a parameter which has been tentatively determined). In the information 402, the processing information indicates the sharpness processing. In the information 402, the file information is the file name “IMG_0001.JPG” of the image file 201*a*.

Next, in S709 and S710, the smartphone 101 (the CPU 105) controls display of the touch panel 104 so that a prescribed graphic image is displayed. Specifically, in S709, display control for displaying a determination-waiting icon 504 in association with the image 301*e* is performed. In addition, in S710, display control for displaying a determination-waiting icon 505 in association with a controller (the slider bar 501) is performed.

Figure 5C:
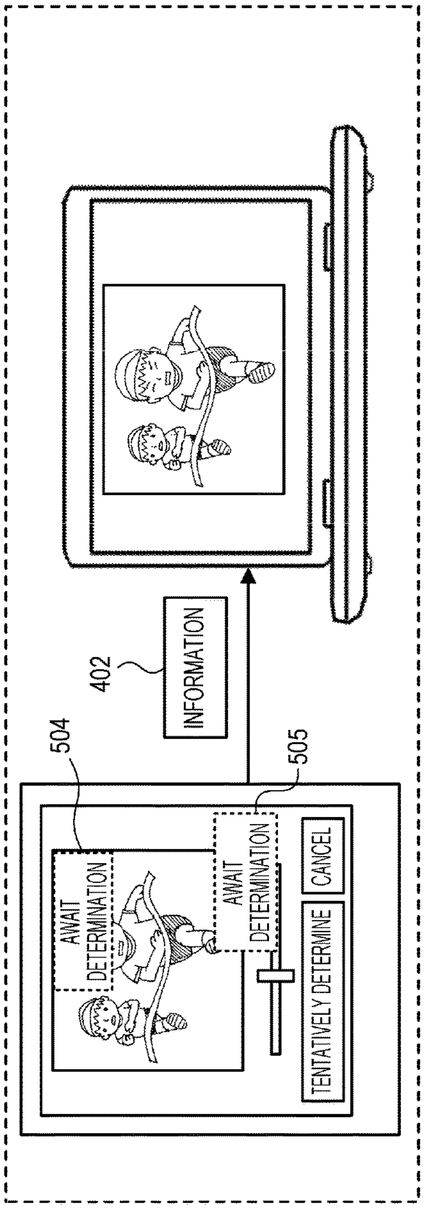

Due to the processes of S709 and S710, the display changes from the display in FIG. 5B to the display in FIG. 5C. By checking at least one of the determination-waiting icon 504 and the determination-waiting icon 505, the user of the smartphone 101 can assess that the parameter of the sharpness processing has not been determined. In addition, the fact that a user operation (a user operation with respect to the personal computer 111) for instructing determination of the set parameter has not been performed, the fact that determined parameter information (to be described later) has not been received by the smartphone 101, and the like can also be assessed. Alternatively, one of the processes of S709 and S710 may be omitted. The prescribed graphic image may not be an icon. For example, the prescribed graphic image may be a text. The number and arrangement of the prescribed graphic image are not particularly limited.

Finally, in S711, the smartphone 101 transmits the information generated in S708 to the personal computer 111. Specifically, the CPU 105 transmits the information generated in S708 to the personal computer 111 using the communication module 102. Subsequently, processing is advanced to S712 and the operation of the smartphone 101 (the flow chart shown in FIG. 7A) is ended.

An operation of the personal computer 111 prior to determination of the parameter of sharpness processing will be described with reference to the flow chart in FIG. 7B. First, in S751, the operation of the personal computer 111 is started. At this point, display of FIGS. 5A to 5C is performed by the personal computer 111. In a case where the personal computer 111 (the communication module 116) receives information (a set parameter) from the smartphone 101, the process of S752 is performed. In the present embodiment, an example in which the information 402 shown in FIG. 4B is received will be described.

In S752, the personal computer 111 (the CPU 117) executes image processing using the parameter included in the received information 402. In this case, image processing indicated by the processing information in the information 402 is executed as the image processing. In addition, the image processing is executed on an image file (second data) corresponding to the image file (first data) indicated by the file information in the information 402. Specifically, the information 402 shows that sharpness processing has been executed on an image file with the file name "IMG_0001.JPG" by the smartphone 101. Therefore, the CPU 117 executes sharpness processing using the parameter included in the information 402 on the image file 201*b*.

Next, in S753, the personal computer 111 (the CPU 117) controls display of the display unit 112 so that an image 301*f* based on the image file obtained by the process of S752 is displayed.

In addition, in S754, the personal computer 111 (the CPU 117) determines whether or not the parameter included in the received information 402 is a determined parameter. In S754, a determination of whether or not the parameter is a determined parameter is made by referring to the determination information included in the received information 402. Subsequently, in S755, processing is branched in accordance with a result of the determination of S754. Since the parameter included in the information 402 is not a determined parameter but a tentatively-determined parameter, after processing is advanced from S754 to S755, the processing is advanced from S755 to S756.

Next, in S756 and S757, the personal computer 111 (the CPU 117) controls display of the display unit 112 so that the tentatively-determined parameter becomes adjustable and, at the same time, a prescribed graphic image is displayed. Specifically, display control for displaying a slider bar 506, an OK button 507, a cancel button 508, and determination-waiting icons 509 and 510 is performed. A result, display changes to the display in FIG. 5D. In addition, in S758, the operation of the personal computer 111 (the flow chart shown in FIG. 7B) is ended. It should be noted that, while an order of display control is not particularly limited, in the present embodiment, the display control for displaying the slider bar 506, the OK button 507, the cancel button 508, and the determination-waiting icon 510 is performed in S756. In addition, the display control for displaying the determination-waiting icon 509 is performed in S757.

Figure 5D:
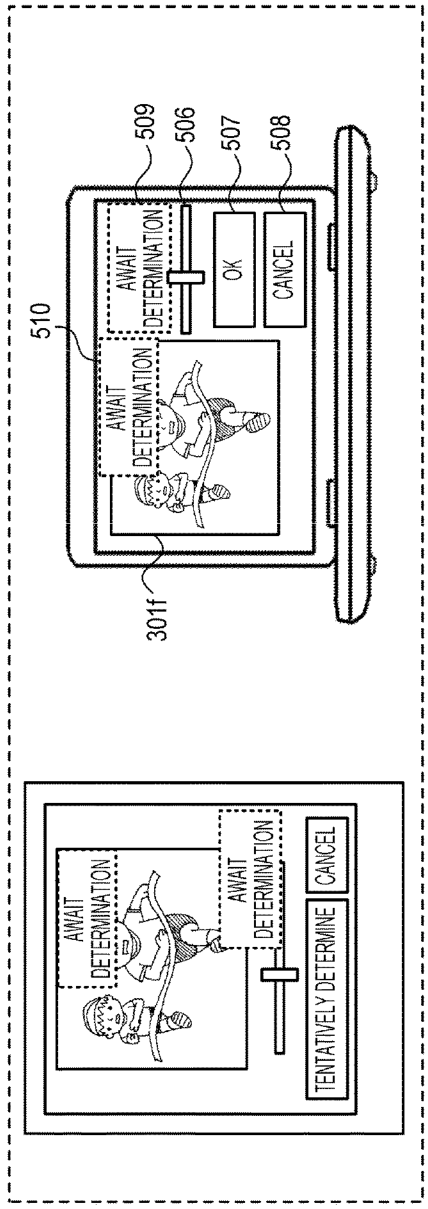

In FIG. 5D, the image 301*f* based on the image file obtained by applying the sharpness processing using the tentatively-determined parameter to the image file 201*b* is also displayed. The user can specify a parameter of sharpness processing using the slider bar 506. The CPU 117 changes (adjusts) the tentatively-determined parameter to the specified parameter and applies the sharpness processing using the tentatively-determined parameter after the change to the image file 201*b*. Accordingly, the image 301*f* is updated. The OK button 507 is a button for determining the tentatively-determined parameter as a parameter, and the cancel button 508 is a button for canceling performed sharpness processing.

The determination-waiting icon 509 is displayed in association with a controller (the slider bar 506) and the determination-waiting icon 510 is displayed in association with the image 301*f*. By checking at least one of the determination-waiting icon 509 and the determination-waiting icon 510, the user of the personal computer 111 can assess that the parameter of the sharpness processing has not been determined. In addition, the fact that a user operation (pressing of the OK button 507) for instructing determination of the set parameter has not been performed, the fact that determined parameter information (to be described later) has not been transmitted to the smartphone 101, and the like can also be assessed. Alternatively, one of the determination-waiting icon 509 and the determination-waiting icon 510 may be omitted. The prescribed graphic image may not be an icon. For example, the prescribed graphic image may be a text. The number and arrangement of the prescribed graphic image are not particularly limited.

An operation of the personal computer 111 in a case where the parameter of sharpness processing is determined will be described with reference to the flow chart in FIG. 8A. First, in S801, the operation of the personal computer 111 is started. Display at this point is the display in FIG. 5D.

Next, in S802, the personal computer 111 (the CPU 117) determines the tentatively-determined parameter of the sharpness processing as the parameter of the sharpness processing. Specifically, in response to the OK button 507 shown in FIG. 5D being pressed, the CPU 117 determines the tentatively-determined parameter as the parameter. In addition, in S803, the CPU 117 performs display control for deleting the determination-waiting icons 509 and 510. As a result, display changes from the display in FIG. 5D to the display in FIG. 5E. In a case where the cancel button 508 is pressed, for example, the sharpness processing performed by the smartphone 101 and the personal computer 111 is canceled and processing is returned to S701.

Figure 5E:
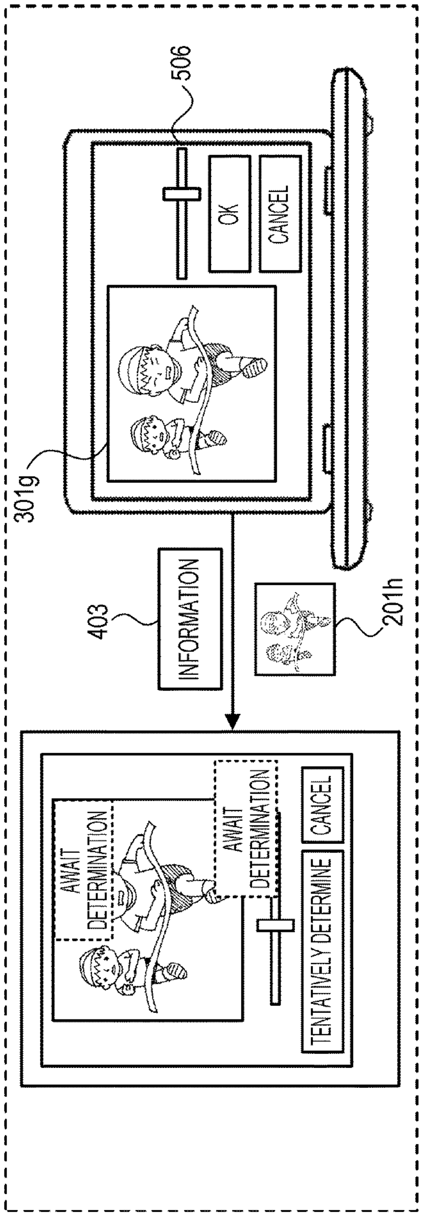

In FIG. 5E, the determination-waiting icons 509 and 510 have been deleted from the screen. By checking that the determination-waiting icons 509 and 510 are deleted, the user of the personal computer 111 can assess that the parameter of the sharpness processing has been determined. In addition, the fact that a user operation for instructing determination of the set parameter has been performed, the fact that determined parameter information (to be described later) is to be transmitted to the smartphone 101 (the determined parameter information has been transmitted to the smartphone), and the like can also be assessed. In FIG. 5E, an image 301*g* is an image based on the image file obtained by applying the sharpness processing using the determined parameter to the image file 201*b*. In FIG. 5E, the slider bar 506 represents the determined parameter.

In addition, in S804 and S805, the personal computer 111 (the CPU 117) generates determined parameter information related to the determined parameter.

Specifically, in S804, the CPU 117 generates information indicating the determined parameter. In the present embodiment, information 403 shown in FIG. 4C is generated. The information 403 includes the determined parameter and other information (determination information, processing information, and file information) corresponding to the determined parameter. The information 403 includes sharpness intensity as the determined parameter. In the information 403, the determination information indicates that a corresponding parameter is a determined parameter. In the information 403, the processing information indicates the sharpness processing. In the information 403, the file information is a file name "IMG_0001.RAW" of the image file 201*b*.

In addition, in S805, the CPU 117 generates a JPEG file (fourth data) 201*h* by reducing a data size of a RAW file (third data). The RAW file which is the third data is a RAW file obtained by applying the sharpness processing using the determined parameter to the image file (RAW file) 201*b*. It should be noted that the third data and the fourth data are not limited to image files.

Next, in S806, as shown in FIG. 5E, the personal computer 111 (the CPU 117) transmits the information 403 generated in S804 and the determined parameter information including the JPEG file 201*h* generated in S805 to the smartphone 101. Specifically, the CPU 117 transmits the generated determined parameter information to the smartphone 101 using the communication module 116. Subsequently, processing is advanced to S807 and the operation of the personal computer 111 (the flow chart shown in FIG. 8A) is ended. It should be noted that determined parameter information is not limited to the information described above. For example, determined parameter information may not include one of the determined parameter and the fourth data.

An operation of the smartphone 101 in a case where the parameter of sharpness processing is determined will be described with reference to the flow chart in FIG. 8B. First, in S821, the operation of the smartphone 101 is started. Display at this point is the display in FIGS. 5C, 5D, and 5E.

Next, in S822, the smartphone 101 (the communication module 102) receives the determined parameter information (the information 403 and the JPEG file 201*h*) from the personal computer 111. In addition, in S823, in accordance with the reception of the determined parameter information, the smartphone 101 (the CPU 105) performs display control for deleting the determination-waiting icons 504 and 505 from the screen of the smartphone 101. Next, in S824, the CPU 105 determines a determined parameter from the received information 403 and performs display control for adjusting a controller (specifically, a position of the slider bar 501) so that the determined parameter is shown. In addition, in S825, the CPU 105 performs display control for replacing the image 301*e* with an image 301*h* based on the received JPEG file 201*h*. Subsequently, processing is advanced to S826 and the operation of the smartphone 101 (the flow chart shown in FIG. 8B) is ended.

Figure 5F:
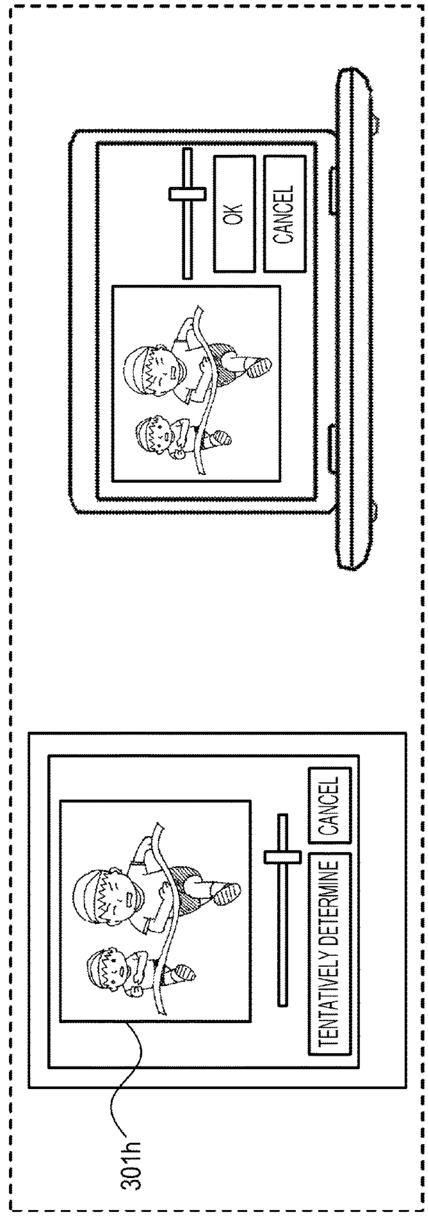

Due to the processes of S823 to S825, the display changes from the display in FIG. 5E to the display in FIG. 5F. In FIG. 5F, since the position of the slider bar 501 has been changed so that the determined parameter is shown, the user of the smartphone 101 can assess the determined parameter by checking the slider bar 501. In FIG. 5F, the image 301*h* is displayed. Therefore, by checking the image 301*h*, the user of the smartphone 101 can check an image similar to the image 301*g* displayed by the personal computer 111.

In addition, in FIG. 5F, the determination-waiting icons 504 and 505 have been deleted from the screen. By checking that the determination-waiting icons 504 and 505 are deleted, the user of the smartphone 101 can assess that the parameter of the sharpness processing has been determined. In addition, the fact that a user operation for instructing determination of the set parameter has been performed, the fact that determined parameter information has been received by the smartphone 101, and the like can also be assessed.

Third Embodiment

A third embodiment of the present invention will be described below. In the first embodiment, an example in which a first parameter (specifically, a parameter of a crop processing) is determined by the smartphone 101 has been described. However, there is also a need to determine the first parameter using the personal computer 111. In consideration thereof, an example in which the first parameter is determined by the personal computer 111 will be described in the present embodiment. Hereinafter, configurations and processes that differ from those of the first embodiment will be described in detail and descriptions of configurations and processes that are similar to those of the first embodiment will be omitted.

An example of an operation of the data processing system according to the present embodiment will be described with reference to FIGS. 4D, 4E, 6A to 6F, 7A, 7B, 8A, and 8B. FIG. 4D is a diagram showing an example of information transmitted from the smartphone 101 to the personal computer 111. FIG. 4E is a diagram showing an example of information transmitted from the personal computer 111 to the smartphone 101. FIGS. 6A to 6F are diagrams showing examples of display of the smartphone 101 and display of the personal computer 111. Hereinafter, an example of performing a crop processing will be described.

Figure 6A:
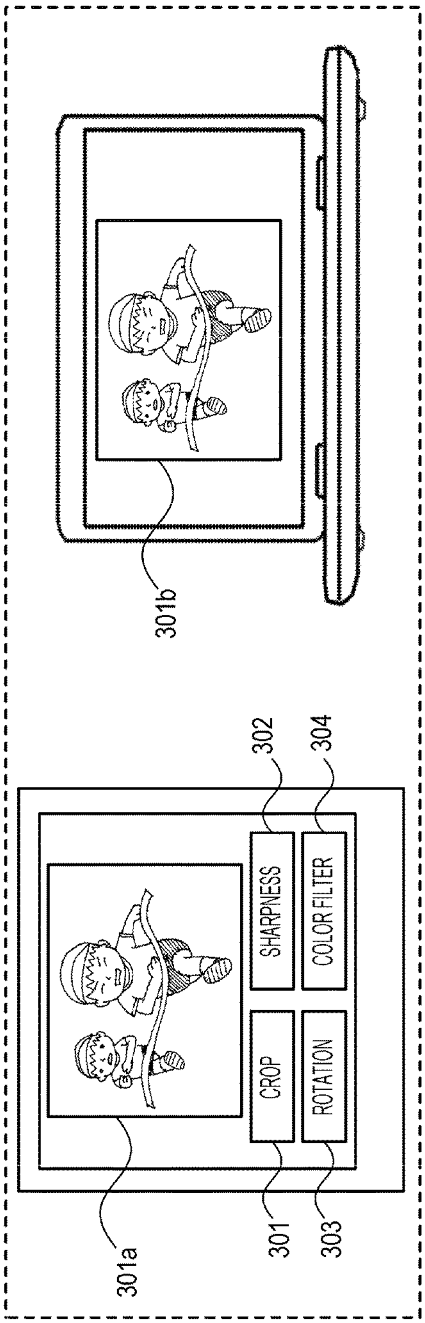
FIGS. 6A to 6F are diagrams showing examples of display according to the third embodiment.

An operation of the smartphone 101 prior to determination of a parameter of the crop processing will be described with reference to the flow chart in FIG. 7A. First, in S701, the operation of the smartphone 101 is started. At this point, the display shown in FIG. 6A is performed. FIG. 6A is the same as FIG. 3A. In a case where the button 301 is pressed, the smartphone 101 becomes capable of setting a parameter (for example, a cutout region) of the crop processing and executing the crop processing.

Next, in S702, in response to a user operation for specifying the parameter of the crop processing, the smartphone 101 (the CPU 105) sets the specified parameter and executes the crop processing using the set parameter on the image file 201*a*. In addition, in S703, the smartphone 101 (the CPU 105) determines whether the image processing executed in S702 is the first data processing or the second data processing. In S703, the determination is made using the list 210 shown in FIG. 2. Subsequently, in S704, processing is branched in accordance with a result of the determination of S703. According to the list 210, the crop processing is the first data processing. Therefore, after processing is advanced from S703 to S704, the processing is advanced from S704 to S705.

Figure 6B:
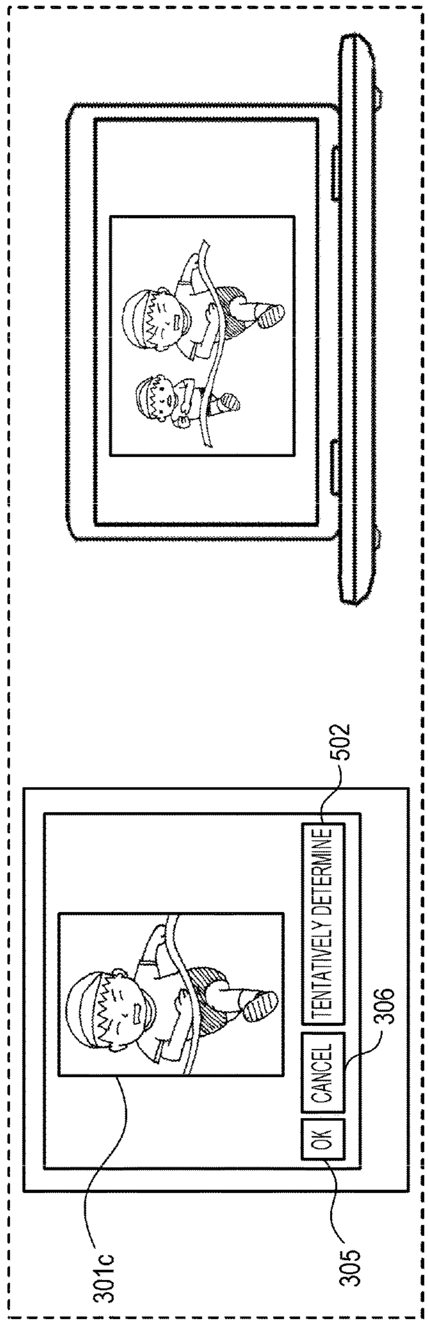

Due to the processes of S702 and S703, the display changes from the display in FIG. 6A to the display in FIG. 6B. In FIG. 6B, the image 301*c* is displayed on the screen of the smartphone 101. In addition, in FIG. 6B, the OK button 305, the cancel button 306, and the tentative determination button 502 are further displayed on the screen of the smartphone 101.

In S705, the smartphone 101 (the CPU 105) determines a type of a pressed button. In this case, a determination is made on which of the OK button 305, the cancel button 306, and the tentative determination button 502 had been pressed. Subsequently, in S706, processing is branched in accordance with a result of the determination of S705. Processing performed in a case where the OK button 305 is pressed and processing performed in a case where the cancel button 306 is pressed are the same as in the first embodiment. In the present embodiment, a case where the tentative determination button 502 is pressed will be described. In a case where the tentative determination button 502 is pressed, the CPU 105 tentatively determines the set parameter as a parameter and advances processing to S708.

In S708, the smartphone 101 (the CPU 105) generates information to be transmitted to the personal computer 111. In S708, information is generated so that the set parameter is transmitted to the personal computer 111. Specifically, information is generated so that the parameter tentatively determined in S705 is transmitted to the personal computer 111. In the present embodiment, information 404 shown in FIG. 4D is generated. The information 404 includes the set parameter and other information (determination information, processing information, and file information) corresponding to the set parameter. The information 404 includes a start point coordinate and an end point coordinate of a cutout region as a set parameter. In the information 404, the determination information indicates that the set parameter is a tentatively-determined parameter. In the information 404, the processing information indicates the crop processing. In the information 404, the file information is the file name "IMG_0001.JPG" of the image file 201*a*.

Next, in S709 and S710, the smartphone 101 (the CPU 105) controls display of the touch panel 104 so that a prescribed graphic image is displayed. Specifically, in S709, display control for displaying the determination-waiting icon 504 in association with the image 301*c* is performed. In addition, in S710, display control for displaying the determination-waiting icon 505 in association with a controller is performed. However, in a case where image processing such as a crop processing is performed, the controller (such as a frame indicating a cutout region) may be deleted from the screen after the image processing. Therefore, in such cases, the CPU 105 can omit the process of S710.

Figure 6C:
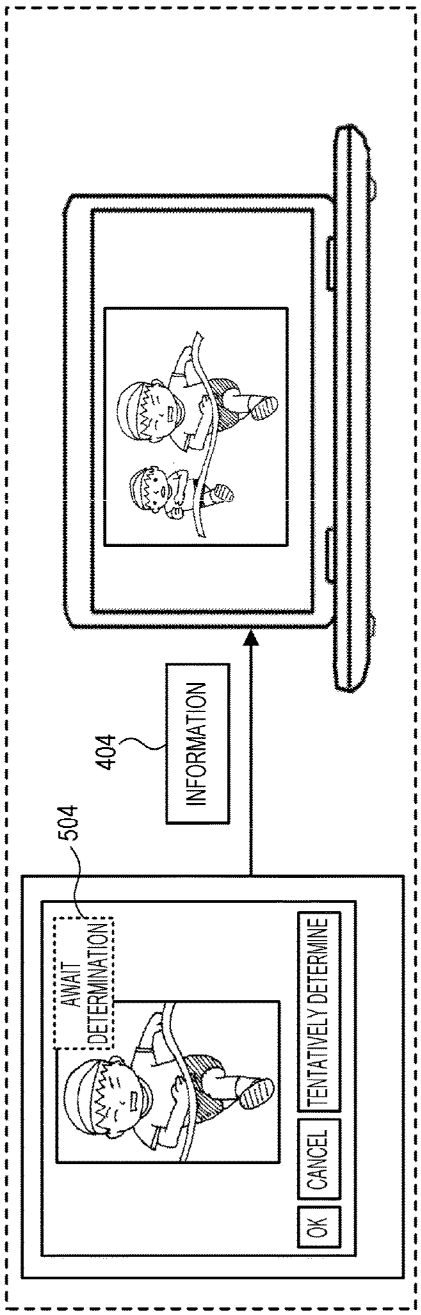

Due to the process of S709 (and S710), the display changes from the display in FIG. 6B to the display in FIG. 6C. By checking the determination-waiting icon 504, the user of the smartphone 101 can assess that the parameter of the crop processing has not been determined. In addition, the fact that a user operation (a user operation with respect to the personal computer 111) for instructing determination of the set parameter has not been performed, the fact that determined parameter information has not been received by the smartphone 101, and the like can also be assessed.

Finally, in S711, the smartphone 101 transmits the information generated in S708 to the personal computer 111. Specifically, the CPU 105 transmits the information generated in S708 to the personal computer 111 using the communication module 102. Subsequently, processing is advanced to S712 and the operation of the smartphone 101 (the flow chart shown in FIG. 7A) is ended.

An operation of the personal computer 111 prior to determination of the parameter of the crop processing will be described with reference to the flow chart in FIG. 7B. First, in S751, the operation of the personal computer 111 is started. At this point, display of FIGS. 6A to 6C is performed by the personal computer 111. In a case where the personal computer 111 (the communication module 116) receives information (a set parameter) from the smartphone 101, the process of S752 is performed. In the present embodiment, an example in which the information 404 shown in FIG. 4D is received will be described.

In S752, the personal computer 111 (the CPU 117) executes image processing using the parameter included in the received information 404. In this case, image processing indicated by the processing information in the information 404 is executed as the image processing. In addition, the image processing is executed on an image file (second data) corresponding to the image file (first data) indicated by the file information in the information 404. Specifically, the information 404 shows that a crop processing has been executed on an image file with the file name "IMG_0001.JPG" by the smartphone 101. Therefore, the CPU 117 executes a crop processing using the parameter included in the information 404 on the image file 201*b*.

Next, in S753, the personal computer 111 (the CPU 117) controls display of the display unit 112 so that a graphic image 601 indicating a result of the image processing in S752 is displayed. While the graphic image 601 is not particularly limited, in the present embodiment, a frame indicating a region (a cutout region) of an image after the crop processing is used as the graphic image 601.

In addition, in S754, the personal computer 111 (the CPU 117) determines whether or not the parameter included in the received information 404 is a determined parameter. Subsequently, in S755, processing is branched in accordance with a result of the determination of S754. Since the parameter included in the information 404 is not a determined parameter but a tentatively-determined parameter, after processing is advanced from S754 to S755, the processing is advanced from S755 to S756.

Next, in S756 and S757, the personal computer 111 (the CPU 117) controls display of the display unit 112 so that the tentatively-determined parameter becomes adjustable and, at the same time, a prescribed graphic image is displayed. Specifically, display control for displaying the OK button 507, the cancel button 508, and determination-waiting icons 509 and 510 is performed. As a result, display changes to the display in FIG. 6D. In addition, in S758, the operation of the personal computer 111 (the flow chart shown in FIG. 7B) is ended. It should be noted that, while an order of display control is not particularly limited, in the present embodiment, the display control for displaying the OK button 507, the cancel button 508, and the determination-waiting icon 510 is performed in S756. In addition, the display control for displaying the determination-waiting icon 509 is performed in S757.

Figure 6D:
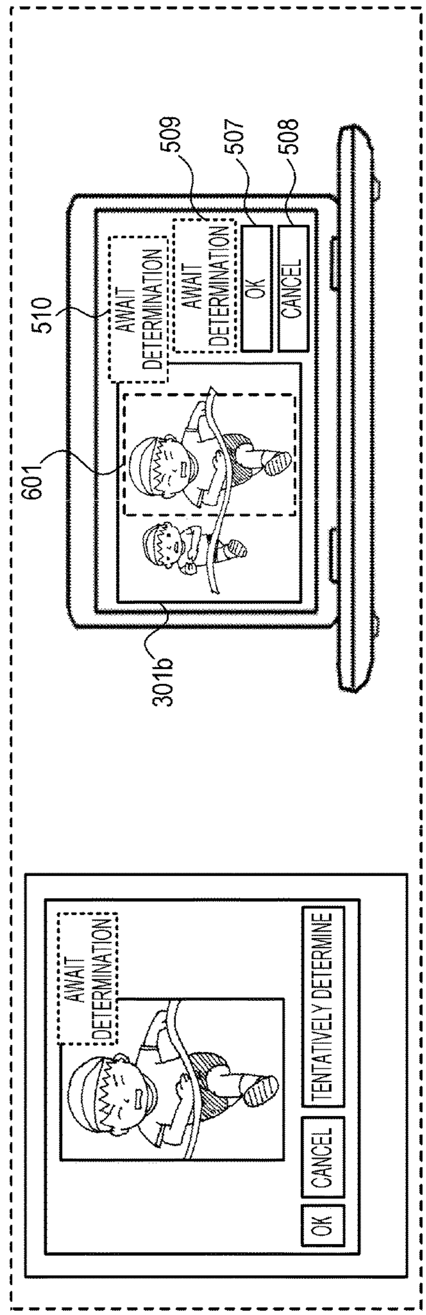

In FIG. 6D, the image 301*b* and the graphic image 601 are also displayed. By checking the graphic image 601 (and the image 301*b*), the user of the personal computer 111 can assess a tentatively-determined parameter (a tentatively-determined cutout region). In addition, the user can specify a parameter of the crop processing using the image 301*b*. Specifically, the user can specify a partial image region of the image 301*b* as the cutout region.

The determination-waiting icon 509 is displayed in association with a controller and the determination-waiting icon 510 is displayed in association with the image 301*b*. By checking at least one of the determination-waiting icon 509 and the determination-waiting icon 510, the user of the personal computer 111 can assess that the parameter of the crop processing has not been determined. In addition, the fact that a user operation (pressing of the OK button 507) for instructing determination of the set parameter has not been performed, the fact that determined parameter information has not been transmitted to the smartphone 101, and the like can also be assessed.

An operation of the personal computer 111 in a case where the parameter of the crop processing is determined will be described with reference to the flow chart in FIG. 8A. First, in S801, the operation of the personal computer 111 is started. Display at this point is the display in FIG. 6D.

Next, in S802, the personal computer 111 (the CPU 117) determines the parameter of the crop processing. Specifically, in response to the OK button 507 shown in FIG. 6D being pressed, the CPU 117 determines the parameter specified using the image 301*b* as the parameter of the crop processing and applies the crop processing using the determined parameter to the image file 201*b*. The "determination of a parameter" described above can also be described as an "adjustment of a parameter from a tentatively-determined parameter to the parameter specified using the image 301*b*". In addition, in S803, the CPU 117 performs display control for deleting the determination-waiting icons 509 and 510. As a result, display changes from the display in FIG. 6D to the display in FIG. 6E. In a case where the cancel button 508 is pressed, for example, the crop processing performed by the smartphone 101 and the personal computer 111 are canceled and processing is returned to S701.

Figure 6E:
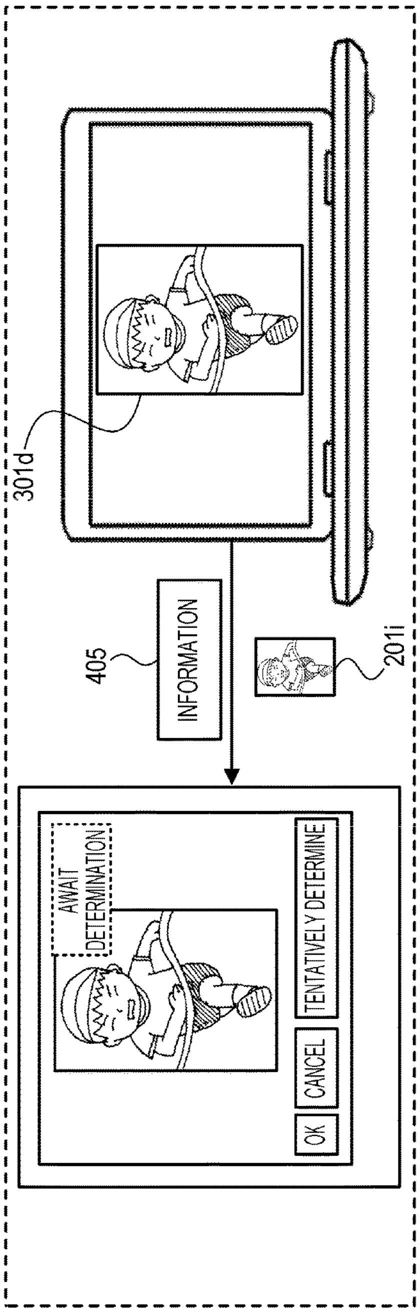

In FIG. 6E, the determination-waiting icons 509 and 510 have been deleted from the screen. By checking that the determination-waiting icons 509 and 510 are deleted, the user of the personal computer 111 can assess that the parameter of the crop processing has been determined. In addition, the fact that a user operation for instructing determination of the set parameter has been performed, the fact that determined parameter information is to be transmitted to the smartphone 101 (the determined parameter information has been transmitted to the smartphone 101), and the like can also be assessed. Furthermore, in FIG. 6E, the image has been changed from the image 301*b* to the image 301*d* (an image based on the image file obtained by applying the crop processing using the determined parameter to the image file 201*b*).

In addition, in S804 and S805, the personal computer 111 (the CPU 117) generates determined parameter information related to the determined parameter.

Specifically, in S804, the CPU 117 generates information indicating the determined parameter. In the present embodiment, information 405 shown in FIG. 4E is generated. The information 405 includes the determined parameter and other information (determination information, processing information, and file information) corresponding to the determined parameter. The information 405 includes a start point coordinate and an endpoint coordinate of a cutout region as the determined parameter. In the information 405, the determination information indicates that a corresponding parameter is a determined parameter. In the information 405, the processing information indicates the crop processing. In the information 405, the file information is the filename "IMG_0001.RAW" of the image file 201*b*.

In addition, in S805, the CPU 117 generates a JPEG file (fourth data) 201*i* by reducing a data size of a RAW file (third data). The RAW file which is the third data is a RAW file obtained by applying the crop processing using the determined parameter to the image file (RAW file) 201*b*.

Next, in S806, as shown in FIG. 6E, the personal computer 111 (the CPU 117) transmits the information 405 generated in S804 and the determined parameter information including the JPEG file 201*i* generated in S805 to the smartphone 101. Specifically, the CPU 117 transmits the generated determined parameter information to the smartphone 101 using the communication module 116. Subsequently, processing is advanced to S807 and the operation of the personal computer 111 (the flow chart shown in FIG. 8A) is ended.

An operation of the smartphone 101 in a case where the parameter of the crop processing is determined will be described with reference to the flow chart in FIG. 8B. First, in S821, the operation of the smartphone 101 is started. Display at this point is the display in FIGS. 6C, 6D, and 6E.

Next, in S822, the smartphone 101 (the communication module 102) receives the determined parameter information (the information 405 and the JPEG file 201*i*) from the personal computer 111. In addition, in S823, in accordance with the reception of the determined parameter information, the smartphone 101 (the CPU 105) performs display control for deleting the determination-waiting icon 504 from the screen of the smartphone 101. Next, in S824, the CPU 105 determines a determined parameter from the received information 405 and performs display control for adjusting a controller so that the determined parameter is shown. However, in a case where it is difficult to continuously display the controller, the CPU 105 can omit the process of S824. In addition, in S825, the CPU 105 performs display control for replacing the image 301*c* with an image 301*i* based on the received JPEG file 201*i*. Subsequently, processing is advanced to S826 and the operation of the smartphone 101 (the flowchart shown in FIG. 8B) is ended.

Figure 6F:
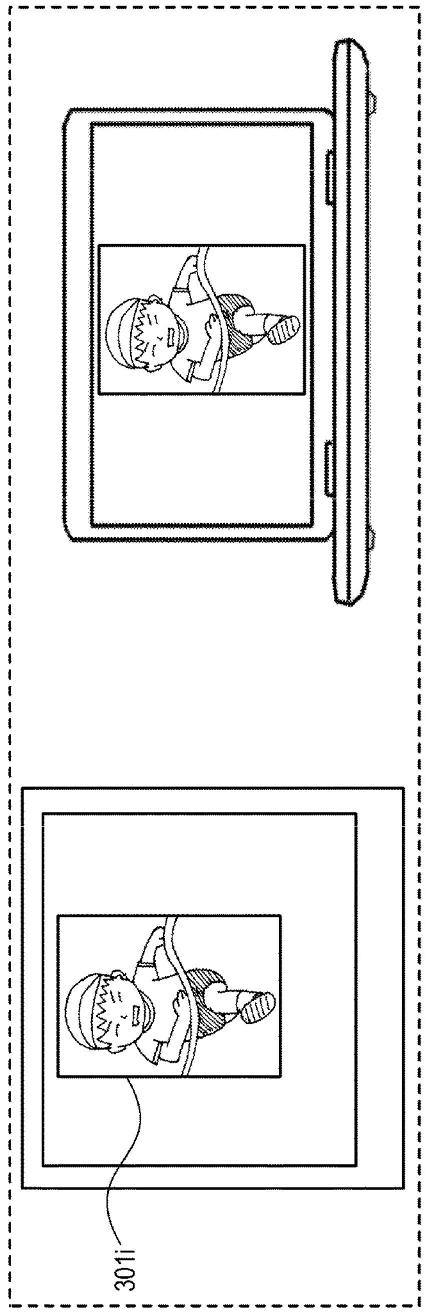

Due to the processes of S823 to S825, the display changes from the display in FIG. 6E to the display in FIG. 6F. In FIG. 6F, the image 301*i* is displayed. Therefore, by checking the image 301*i*, the user of the smartphone 101 can check an image similar to the image 301*d* displayed by the personal computer 111. In FIG. 6F, the determination-waiting icon 504 has been deleted from the screen. By checking that the determination-waiting icon 504 is deleted, the user of the smartphone 101 can assess that the parameter of the crop processing has been determined. In addition, the fact that a user operation for instructing determination of the set parameter has been performed, the fact that determined parameter information has been received by the smartphone 101, and the like can also be assessed.

As described above, according to the first to third embodiments, the first apparatus can set a plurality of types of parameters including a second parameter which is a parameter that cannot be determined by the first apparatus but can be determined by the second apparatus. The first apparatus transmits a set parameter to the second apparatus. The second apparatus receives the set parameter from the first apparatus and executes data processing using the set parameter. In addition, the second apparatus performs display control for making whether or not the set parameter has been determined identifiable. Accordingly, convenience of synchronization of information among a plurality of apparatuses can be improved. For example, the user can assess which parameter is undetermined. In addition, the user can efficiently perform an operation for determining a parameter without having to memorize previously-conceived contents of image processing.

It should be noted that, in a case where image files are used as the first data and the second data, the first data and the second data may be data of still images or data of moving images. In addition, the file format of the first data is not limited to the JPEG format and the file format of the second data is not limited to the RAW format. The file format of the first data may be the same as the file format of the second data. The first data may be apart of the second data (a part of an image range, a part of a scene, or the like). The first data may be data obtained by reducing an image size of the second data.

It should be noted that the first to third embodiments are merely examples and configurations obtained by appropriately modifying or altering the configurations of the first to third embodiments without departing from the spirit and scope of the present invention are also included in the present invention.

Configurations obtained by appropriately combining the configurations of the first to third embodiments are also included in the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-082032, filed on Apr. 15, 2016, which is hereby incorporated by reference herein in its entirety.

What is claimed is:

1. A data processing apparatus, which is a second apparatus communicating with a first apparatus, wherein the first apparatus comprises:

a first setting unit configured to set, according to a user operation, a first parameter to be used in a first image processing including at least one of crop and rotation, wherein when first parameters are the same in the first image processing to first image data and the first image processing to second image data, a result of the first image processing to the first image data is the same as a result of the first image processing to the second image data, the second image data having a data format different from a data format of the first image data, and having a size larger than a size of the first image data;

a second setting unit configured to set, according to a user operation, a second parameter to be used in a second image processing including at least one of sharpness and color adjustment, wherein when second parameters are the same in the second image processing to the first image data and the second image processing to the second image data, a result of the second image processing to the first image data is different from a result of the second image processing to the second image data;

a first processing unit configured to execute the first image processing using the first parameter set by the first setting unit to the first image data;

a first transmitting unit configured to transmit a set parameter which is at least one of the first parameter set by the first setting unit and the second parameter set by the second setting unit, to the second apparatus, in response to a user operation;

a display control unit configured to display predetermined information indicating that the second parameter has not been determined; and a first receiving unit configured to receive determination information indicating that the second parameter has been determined, from the second apparatus, wherein the second apparatus comprises:

a second receiving unit configured to receive the set parameter transmitted by the first transmitting unit, from the first apparatus;

a second processing unit configured to execute, in a case where the first parameter is received by the second receiving unit, the first image processing using the received first parameter to the second image data, and execute, in a case where the second parameter is received by the second receiving unit, the second image processing using the received second parameter to the second image data; and a second transmitting unit configured to transmit the determination information indicating that the received second parameter has been determined, to the first apparatus, in response to a user operation, wherein the display control unit stops displaying the predetermined information indicating that the second parameter has not been determined in response to receiving the determination information from the second apparatus by the first receiving unit.

2. The data processing apparatus according to claim 1 further comprising:

an adjustment unit configured to adjustment the set parameter received by the second receiving unit, wherein the second transmitting unit transmits a set parameter adjusted by the adjustment unit to the first apparatus.

3. The data processing apparatus according to claim 1 further comprising:

a generating unit configured to generate fourth image data by reducing a third image data generated from the second image data by the second processing unit, wherein the second transmitting unit transmits the fourth data to the first apparatus.

4. The data processing apparatus according to claim 1, wherein the first image data is image data obtained by a predetermined image processing on the second image data.

5. The data processing apparatus according to claim 4, wherein the predetermined image processing is a developing processing.

6. The data processing apparatus according to claim 1, wherein the first image data is not RAW image data, and the second image data is RAW image data.

7. The data processing apparatus according to claim 6, wherein the first image data is JPEG image data.

8. A data processing apparatus, which is a first apparatus communicating with a second apparatus, comprising:

a first setting unit configured to set, according to a user operation, a first parameter to be used in a first image processing including at least one of crop and rotation, wherein when first parameters are the same in the first image processing to first image data and the first image processing to second image data, a result of the first image processing to the first image data is the same as a result of the first image processing to the second image data, the second image data having a data format different from a data format of the first image data, and having a size larger than a size of the first image data;

a second setting unit configured to set, according to a user operation, a second parameter to be used in a second image processing including at least one of sharpness and color adjustment, wherein when second parameters are the same in the second image processing to the first image data and the second image processing to the second image data, a result of the second image processing to the first image data is different from a result of the second image processing to the second image data;

a processing unit configured to execute the first image processing using the first parameter set by the first setting unit to the first image data;

a transmitting unit configured to transmit a set parameter which is at least one of the first parameter set by the first setting unit and the second parameter set by the second setting unit, to the second apparatus, in response to a user operation;

a display control unit configured to display predetermined information indicating that the second parameter has not been determined; and a receiving unit configured to receive determination information indicating that the second parameter has been determined, from the second apparatus, wherein the display control unit stops displaying the predetermined information indicating that the second parameter has not been determined in response to receiving the determination information from the second apparatus by the receiving unit.

9. The data processing apparatus according to claim 8, wherein the first processing is a processing cutting out a part of image data or a processing rotating the image data.

10. The data processing apparatus according to claim 8, wherein the second processing is a processing adjusting sharpness of image data or a processing adjusting color of the image data.

11. A data processing method for a second apparatus communicating with a first apparatus, wherein the first apparatus comprises:

a first setting unit configured to set, according to a user operation, a first parameter to be used in a first image processing including at least one of crop and rotation, wherein when first parameters are the same in the first image processing to first image data and the first image processing to second image data, a result of the first image processing to the first image data is the same as a result of the first image processing to the second image data, the second image data having a data format different from a data format of the first image data, and having a size larger than a size of the first image data;

a second setting unit configured to set, according to a user operation, a second parameter to be used in a second image processing including at least one of sharpness and color adjustment, wherein when second parameters are the same in the second image processing to the first image data and the second image processing to the second image data, a result of the second image processing to the first image data is different from a result of the second image processing to the second image data;

a processing unit configured to execute the first image processing using the first parameter set by the first setting unit to the first image data;

a transmitting unit configured to transmit a set parameter which is at least one of the first parameter set by the first setting unit and the second parameter set by the second setting unit, to the second apparatus, in response to a user operation;

a display control unit configured to display predetermined information indicating that the second parameter has not been determined; and a receiving unit configured to receive determination information indicating that the second parameter has been determined, from the second apparatus, wherein the method comprises:

a receiving step of receiving the set parameter transmitted by the transmitting unit, from the first apparatus;

a processing step of executing, in a case where the first parameter is received in the receiving step, the first image processing using the received first parameter to the second image data, and executing, in a case where the second parameter is received in the receiving step, the second image processing using the received second parameter to the second image data; and a transmitting step of transmitting the determination information indicating that the received second parameter has been determined, to the first apparatus, in response to a user operation, wherein the display control unit stops displaying the predetermined information indicating that the second parameter has not been determined in response to receiving the determination information from the second apparatus by the receiving unit.

12. A data processing method for a first apparatus communicating with a second apparatus, comprising:

a first setting step of setting, according to a user operation, a first parameter to be used in a first image processing including at least one of crop and rotation, wherein when first parameters are the same in the first image processing to first image data and the first image processing to second image data, a result of the first image processing to the first image data is the same as a result of the first image processing to the second image data, the second image data having a data format different from a data format of the first image data, and having a size larger than a size of the first image data;

a second setting step of setting, according to a user operation, a second parameter to be used in a second image processing including at least one of sharpness and color adjustment, wherein when second parameters are the same in the second image processing to the first image data and the second image processing to the second image data, a result of the second image processing to the first image data is different from a result of the second image processing to the second image data;

a processing step of executing the first image processing using the first parameter set in the first setting step to the first image data;

a transmitting step of transmitting a set parameter which is at least one of the first parameter set in the first setting step and the second parameter set in the second setting step, to the second apparatus, in response to a user operation;

a display control step of displaying predetermined information indicating that the second parameter has not been determined; and a receiving step of receiving determination information indicating that the second parameter has been determined, from the second apparatus, wherein, in the display control step, the predetermined information indicating that the second parameter has not been determined in response to receiving is stopped displaying in response to receiving the determination information from the second apparatus in the receiving step.

13. A non-transitory computer-readable medium that stores a program wherein the program causes a computer to execute a data processing method for a second apparatus communicating with a first apparatus, wherein the first apparatus comprises:

a first setting unit configured to set, according to a user operation, a first parameter to be used in a first image processing including at least one of crop and rotation, wherein when first parameters are the same in the first image processing to first image data and the first image processing to second image data, a result of the first image processing to the first image data is the same as a result of the first image processing to the second image data, the second image data having a data format different from a data format of the first image data, and having a size larger than a size of the first image data;

a second setting unit configured to set, according to a user operation, a second parameter to be used in a second image processing including at least one of sharpness and color adjustment, wherein when second parameters are the same in the second image processing to the first image data and the second image processing to the second image data, a result of the second image processing to the first image data is different from a result of the second image processing to the second image data;

a processing unit configured to execute the first image processing using the first parameter set by the first setting unit to the first image data;

a transmitting unit configured to transmit a set parameter which is at least one of the first parameter set by the first setting unit and the second parameter set by the second setting unit, to the second apparatus, in response to a user operation;

a display control unit configured to display predetermined information indicating that the second parameter has not been determined; and a receiving unit configured to receive determination information indicating that the second parameter has been determined, from the second apparatus, wherein the method comprises:

a receiving step of receiving the set parameter transmitted by the transmitting unit, from the first apparatus;

a processing step of executing, in a case where the first parameter is received in the receiving step, the first image processing using the received first parameter to the second image data, and executing, in a case where the second parameter is received in the receiving step, the second image processing using the received second parameter to the second image data; and a transmitting step of transmitting the determination information indicating that the received second parameter has been determined, to the first apparatus, in response to a user operation, wherein the display control unit stops displaying the predetermined information indicating that the second parameter has not been determined in response to receiving the determination information from the second apparatus by the receiving unit.

14. A non-transitory computer-readable medium that stores a program wherein the program causes a computer to execute a data processing method for a first apparatus communicating with a second apparatus, comprising:

a first setting step of setting, according to a user operation, a first parameter to be used in a first image processing including at least one of crop and rotation, wherein when first parameters are the same in the first image processing to first image data and the first image processing to second image data, a result of the first image processing to the first image data is the same as a result of the first image processing to the second image data, the second image data having a data format different from a data format of the first image data, and having a size larger than a size of the first image data;

a second setting step of setting, according to a user operation, a second parameter to be used in a second image processing including at least one of sharpness and color adjustment, wherein when second parameters are the same in the second image processing to the first image data and the second image processing to the second image data, a result of the second image processing to the first image data is different from a result of the second image processing to the second image data;

a processing step of executing the first image processing using the first parameter set in the first setting step to the first image data;

a transmitting step of transmitting a set parameter which is at least one of the first parameter set in the first setting step and the second parameter set in the second setting step, to the second apparatus, in response to a user operation;

a display control step of displaying predetermined information indicating that the second parameter has not been determined; and a receiving step of receiving determination information indicating that the second parameter has been determined, from the second apparatus, wherein, in the display control step, the predetermined information indicating that the second parameter has not been determined is stopped displaying in response to receiving the determination information from the second apparatus in the receiving step.

* * * * *